United States Patent
Maeto

(10) Patent No.: US 11,335,375 B2
(45) Date of Patent: May 17, 2022

(54) MAGNETIC DISK DEVICE AND ERROR CORRECTION METHOD

(71) Applicants: Kabushiki Kaisha Toshiba, Tokyo (JP); Toshiba Electronic Devices & Storage Corporation, Tokyo (JP)

(72) Inventor: Nobuhiro Maeto, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/170,052

(22) Filed: Feb. 8, 2021

(65) Prior Publication Data
US 2022/0044702 A1 Feb. 10, 2022

(30) Foreign Application Priority Data
Aug. 5, 2020 (JP) .............................. JP2020-132886

(51) Int. Cl.
*G11B 20/18* (2006.01)
(52) U.S. Cl.
CPC ...... *G11B 20/1889* (2013.01); *G11B 20/1816* (2013.01); *G11B 20/1833* (2013.01); *G11B 2020/183* (2013.01); *G11B 2020/185* (2013.01); *G11B 2220/2516* (2013.01)
(58) Field of Classification Search
None
See application file for complete search history.

(56) References Cited

U.S. PATENT DOCUMENTS

| | | | |
|---|---|---|---|
| 5,745,453 A * | 4/1998 | Ikeda ...................... | G11B 5/09 360/48 |
| 5,872,800 A | 2/1999 | Glover et al. | |
| 6,239,931 B1 | 5/2001 | Chung et al. | |
| 7,050,252 B1 | 5/2006 | Vallis | |
| 9,837,115 B1 * | 12/2017 | Sridhara ............ | G11B 20/1833 |
| 10,910,013 B1 * | 2/2021 | Kawabe ............ | G11B 20/1816 |
| 2008/0270672 A1 * | 10/2008 | Kowa ................ | G11B 20/1883 711/4 |
| 2011/0107186 A1 * | 5/2011 | Kim ................... | G11B 20/1883 714/769 |
| 2011/0239080 A1 * | 9/2011 | Sakaue .............. | G06F 11/1048 714/752 |
| 2013/0275767 A1 * | 10/2013 | Furuhashi .......... | G06F 12/1408 713/189 |
| 2014/0289493 A1 * | 9/2014 | Kobayashi .......... | G06F 12/0868 711/171 |
| 2015/0089317 A1 * | 3/2015 | Patapoutian ........ | H03M 13/353 714/755 |
| 2018/0137006 A1 * | 5/2018 | Yamamoto .......... | G06F 11/1012 |
| 2019/0378543 A1 * | 12/2019 | Maeto .................... | G11B 5/012 |

* cited by examiner

*Primary Examiner* — Peter Vincent Agustin
(74) *Attorney, Agent, or Firm* — Allen & Overy LLP

(57) ABSTRACT

According to one embodiment, a magnetic disk device includes a disk, a head that writes data to the disk and reads data from the disk, and a controller that executes error correction on a first sector which is unreadable in a first track from an initial reading time of initially one-round reading the first track of the disk based on first parity data corresponding to the first track.

15 Claims, 12 Drawing Sheets

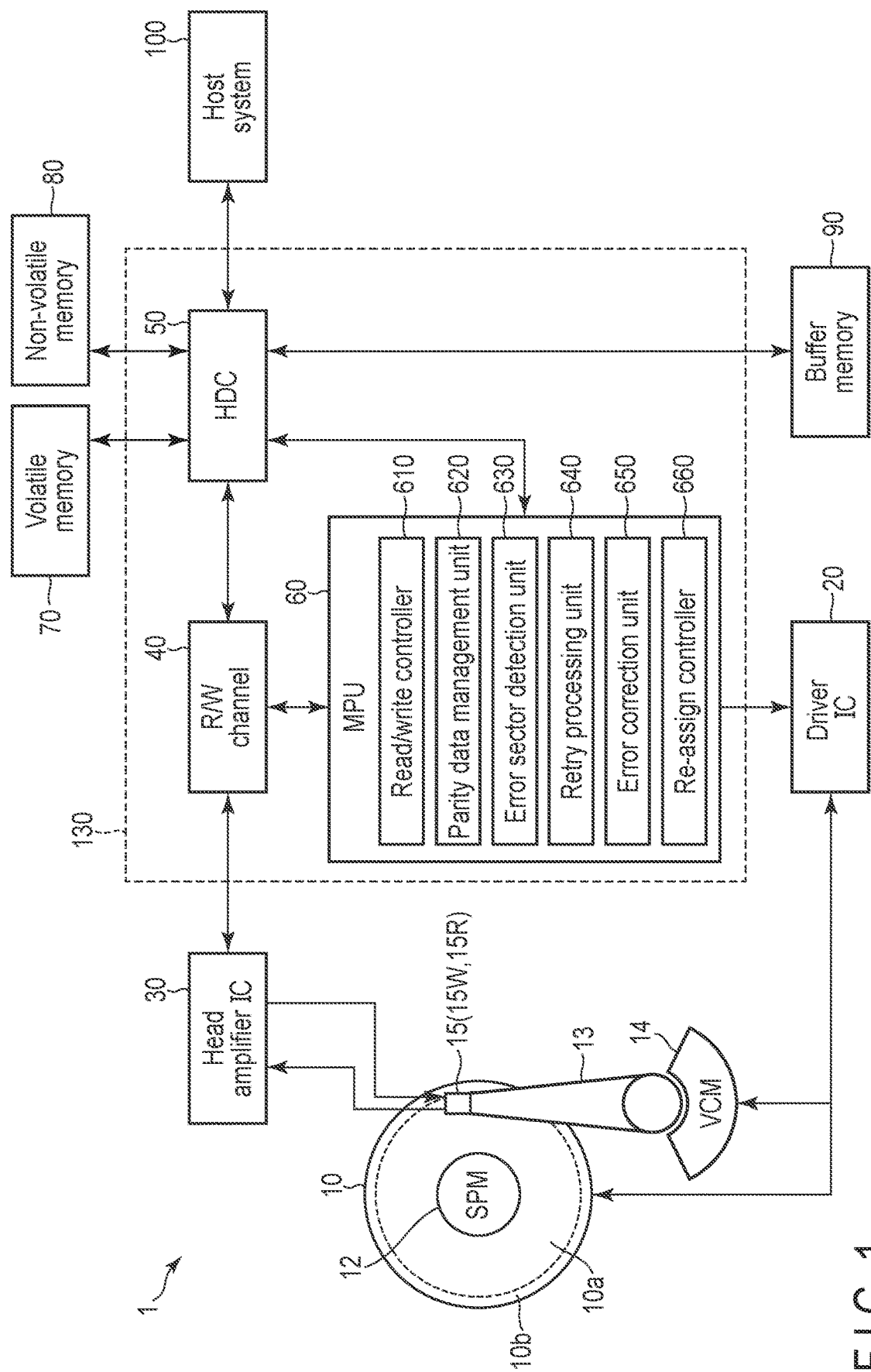
F I G. 1

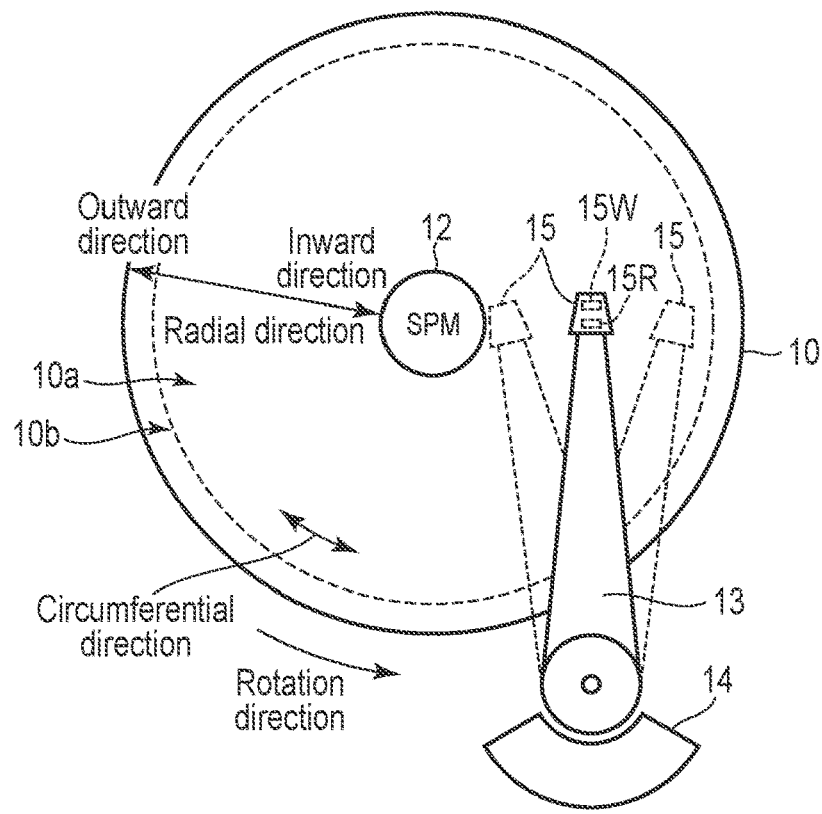
F I G. 2
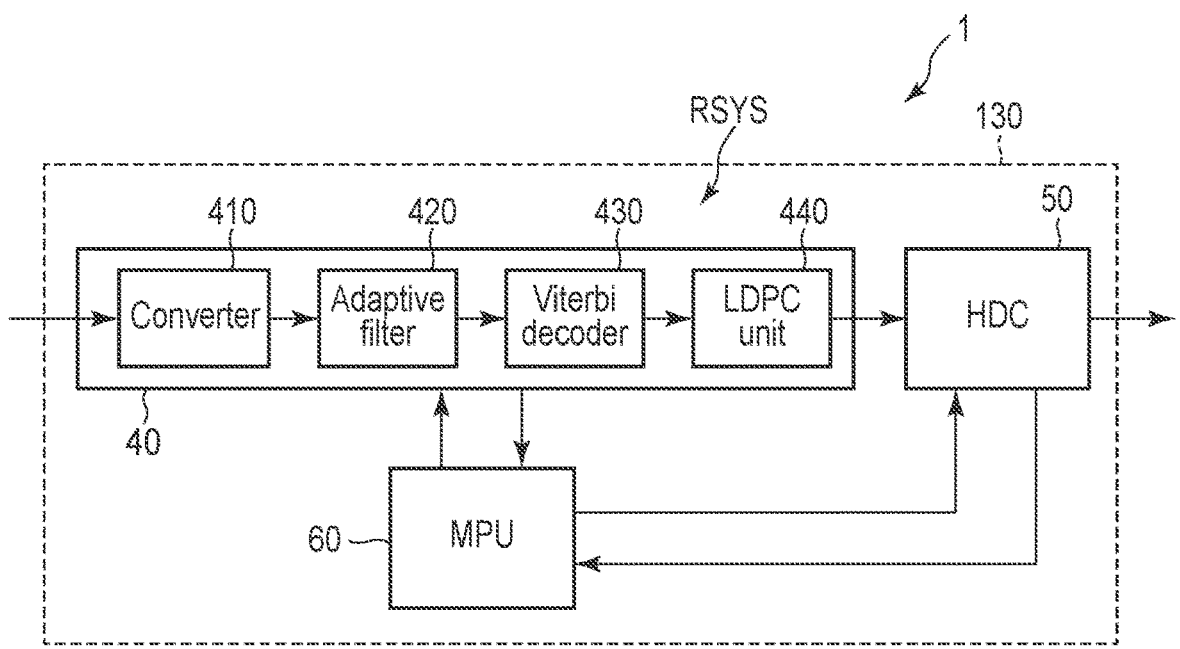
F I G. 3

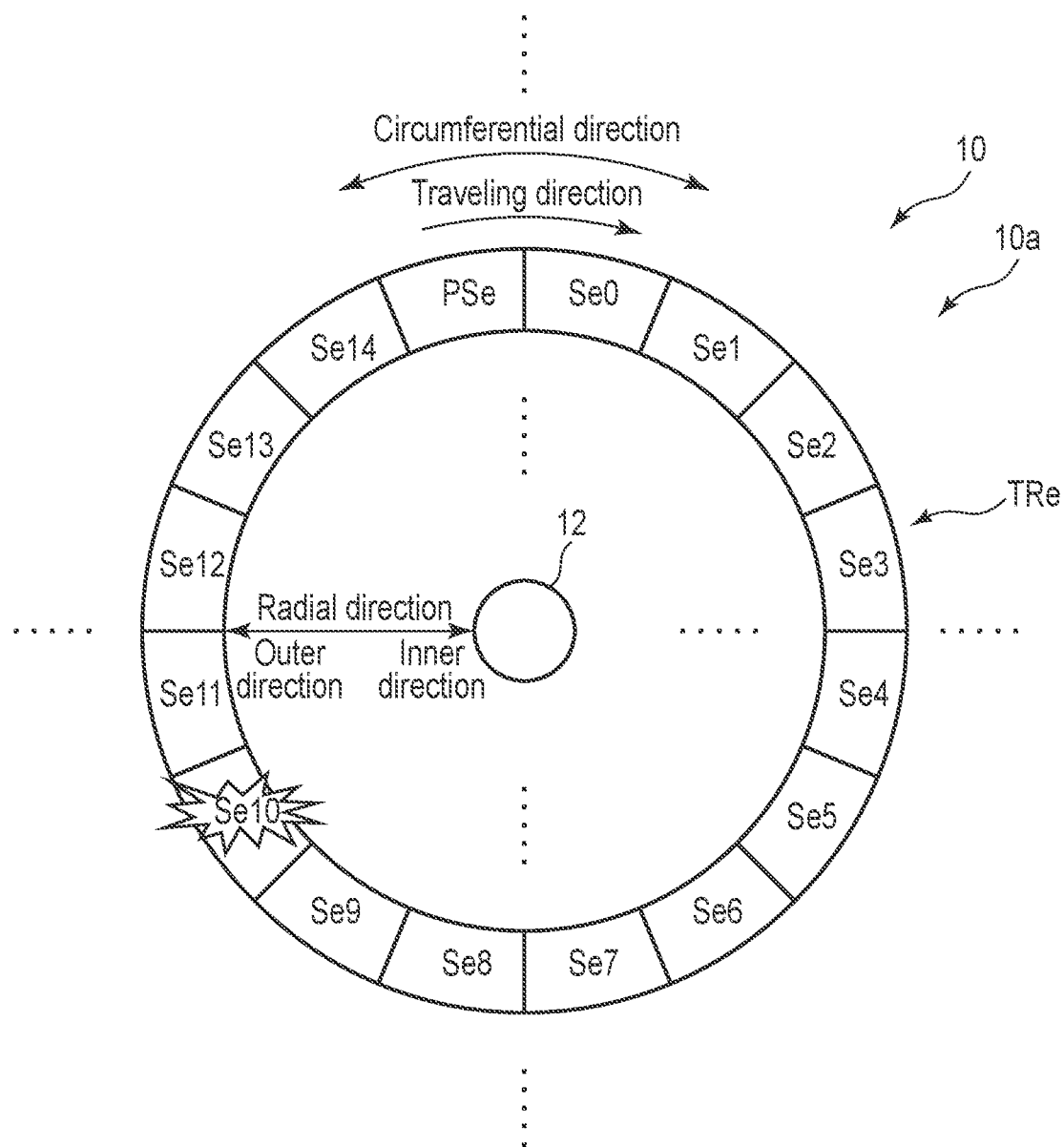
F I G. 4

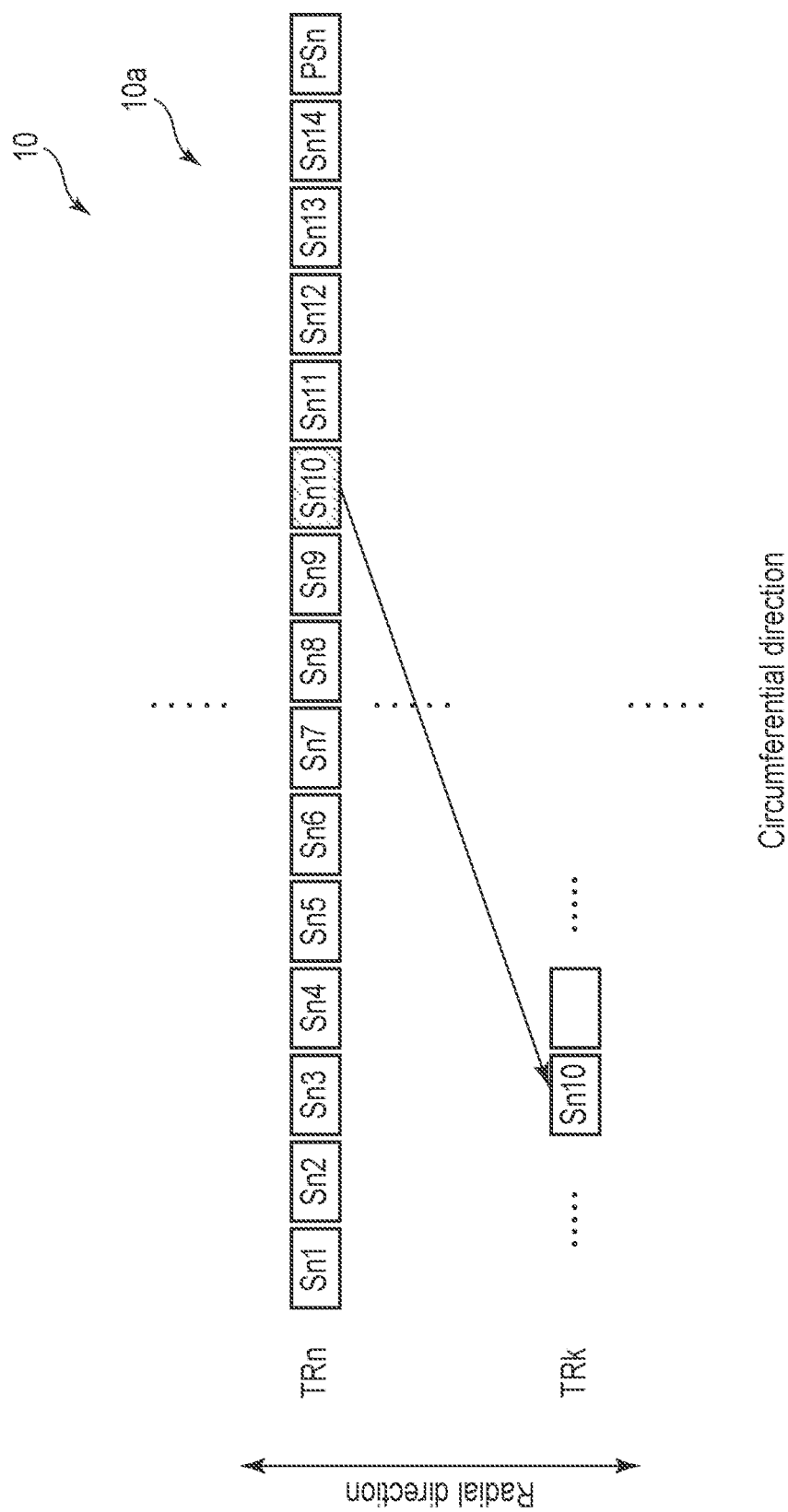
F I G. 7

| Retry Step | Read off-set | ... | Read Retry | Re-Assign |
|---|---|---|---|---|
| 0 | 0 | ... | Yes | Yes |
| 1 | 0 | ... | Yes | Yes |
| 2 | 0 | ... | Yes | Yes |
| 3 | 0 | ... | Yes | Yes |
| 4 | ±OS1 | ... | Yes | Yes |
| 5 | ±OS2 | ... | Yes | Yes |
| 6 | ±OS3 | ... | Yes | Yes |
| ⋮ | ⋮ | ⋮ | ⋮ | ⋮ |

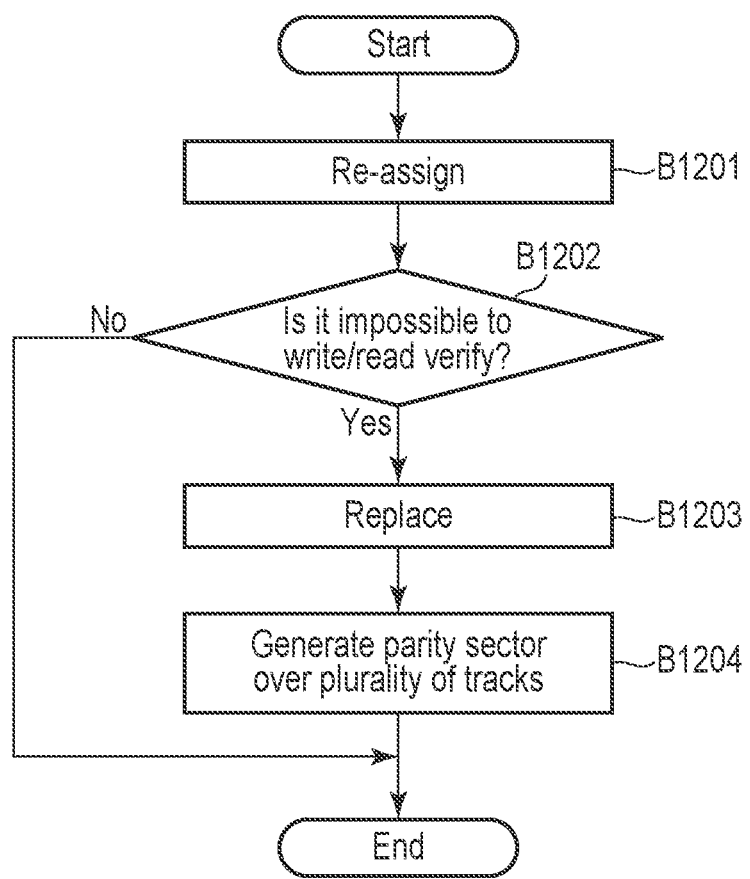
F I G. 12

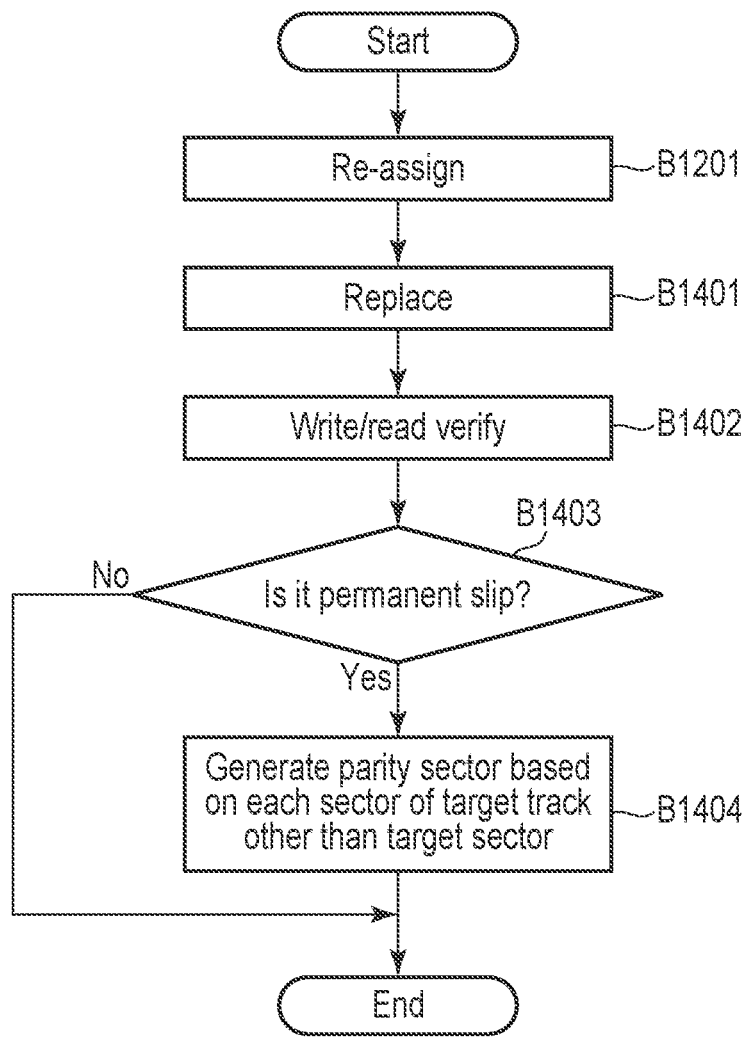
F I G. 14

MAGNETIC DISK DEVICE AND ERROR CORRECTION METHOD

CROSS-REFERENCE TO RELATED APPLICATIONS

This application is based upon and claims the benefit of priority from Japanese Patent Application No. 2020-132886, filed Aug. 5, 2020, the entire contents of which are incorporated herein by reference.

FIELD

Embodiments described herein relate generally to a magnetic disk device and an error correction method.

BACKGROUND

In a case where a magnetic disk device detects a sector (hereinafter, may be referred to as a read error sector) which cannot be read on a particular track, the magnetic disk device read (hereinafter, may be referred to as a read retry) the read error sector again a particular number of times or more. In a case where the read error sector cannot be read even after the read retry is performed a particular number or more of times, the magnetic disk device executes a read retry method (hereinafter, may be referred to as a powerful read retry method) in which a possibility of reading the read error sector is higher than that of a normal read retry such as Averaging and defect Detector in the read error sector. In a case where the read error sector can be read (recovered or relieved) by executing a read retry or a powerful read retry method a particular number or more of times, the magnetic disk device re-assigns the recovered read error sector. Further, the magnetic disk device may have an error correction function of correcting a read error based on the parity data corresponding to a particular track as a powerful read retry method. The magnetic disk device having the error correction function can set a high Track Per Inch (TPI) of the disk. In a case where the TPI of the disk is set high, a sector recoverable only by the error correction function is generated due to Drift-off-Write (DOW) or the like. Since the magnetic disk device can easily correct scratches on the disk, pitch unevenness, and the like by the error correction function, it may be necessary to execute re-assigning regardless of the number of read retries.

BRIEF DESCRIPTION OF THE DRAWINGS

FIG. 1 is a block diagram illustrating a configuration of a magnetic disk device according to a first embodiment.

FIG. 2 is a schematic view illustrating an example of an arrangement of a head with respect to a disk according to the first embodiment.

FIG. 3 is a block diagram illustrating an example of a read system RSYS of an R/W channel.

FIG. 4 is a schematic diagram illustrating an example of a method of error correction in track units according to the first embodiment.

FIG. 7 is a schematic diagram illustrating an example of a re-assign.

FIG. 12 is a flowchart illustrating an example of the parity sector generation method according to the first modification.

FIG. 14 is a flowchart illustrating an example of the parity sector generation method according to the second modification.

DETAILED DESCRIPTION

Figure 5:
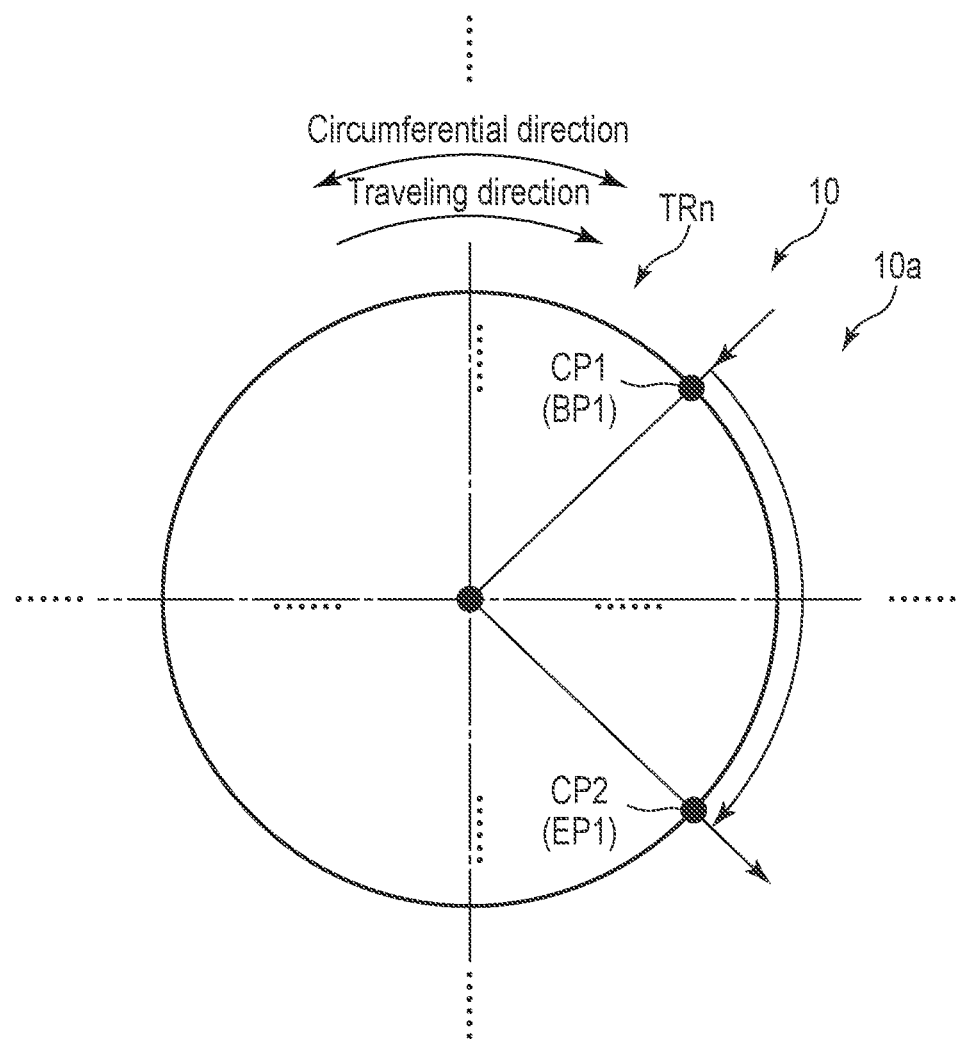
FIG. 5 is a diagram illustrating an example of read processing without read retry.

In general, according to one embodiment, a magnetic disk device comprises: a disk; a head that writes data to the disk and reads data from the disk; and a controller that executes error correction on a first sector which is unreadable in a first track from an initial reading time of initially one-round reading the first track of the disk based on first parity data corresponding to the first track.

Hereinafter, embodiments will be described with reference to the drawings. Incidentally, the drawings are an example and do not limit the scope of the invention.

First Embodiment

FIG. 1 is a block diagram illustrating a configuration of a magnetic disk device 1 according to a first embodiment.

The magnetic disk device 1 includes a head disk assembly (HDA) described later, a driver IC 20, a head amplifier integrated circuit (hereinafter, may be referred to as a head amplifier IC or a preamplifier) 30, a volatile memory 70, and non-volatile memory 80, a buffer memory (buffer) 90, and a system controller 130 which is an integrated circuit of one chip. Further, the magnetic disk device 1 is connected to a host system (host) 100.

The HDA has a magnetic disk (hereinafter referred to as a disk) 10, a spindle motor (SPM) 12, an arm 13 on which a head 15 is mounted, and a voice coil motor (VCM) 14. The disk 10 is attached to the spindle motor 12 and rotates by driving the spindle motor 12. The arm 13 and the VCM 14 form an actuator. The actuator controls the movement of the head 15 mounted on the arm 13 to a particular position on the disk 10 by the driving of the VCM 14. The disk 10 and the head 15 may be provided in two or more numbers.

In the disk 10, a user data region 10a which can be used by a user and a system area 10b which records information necessary for system management are allocated in a region where data can be written. Incidentally, in the disk 10, a media cache (may be referred to as a media cache region) which temporarily holds data (or a command) transferred from the host 100 or the like before writing to a particular region of the user data region 10a may be allocated as a region separate from the user data region 10a and the system area 10b. Hereinafter, a direction from the inner circumference to the outer circumference of the disk 10 or a direction from the outer circumference to the inner circumference of the disk 10 is referred to as a radial direction. In the radial direction, the direction from the inner circumference to the outer circumference is referred to as an outer direction (or an outer side), and the direction from the outer circumference to the inner circumference, that is, the direction opposite to the outer direction is referred to as an inner direction (or an inner side). The direction orthogonal to the radial direction of the disk 10 is referred to as a circumferential direction. That is, the circumferential direction corresponds to the direction along the circumference of the disk 10. Further, a particular position of the disk 10 in the radial direction may be referred to as a radial position, and a particular position of the disk 10 in the circumferential direction may be referred to as a circumferential position. The radial position and the circumferential position may be collectively referred to as a position. The disk 10 is divided into a plurality of regions (hereinafter may be referred to as zones or zone regions) at particular radial intervals. In the zone, data can be written at particular radial intervals. In other words, a plurality of tracks can be written in the zone. In the track, data can be written at particular circumferential intervals. In other words, the track includes a plurality of sectors. Incidentally, the "track" is used as various meanings of a region of a plurality of regions obtained by dividing the disk 10 at particular radial intervals, a route of the head 15 at a particular radial position of the disk 10, data extending circumferentially in a particular radial direction of the disk 10, data for a round written on a particular track of the disk 10, data written on a particular track of the disk 10, and the like. The "sector" is used as various meanings of a region of a plurality of regions obtained by dividing a particular track of the disk 10 in the circumferential direction, data written at a particular circumferential position at a particular radial position of the disk 10, data written in a particular sector of the disk 10, and the like. The "radial width of the track" may be referred to as a "track width". Further, the "radial width of the sector" may be referred to as a "sector width".

The head 15 includes a slider as a main body, and a write head 15W and a read head 15R mounted on the slider. The write head 15W writes data to the disk 10. For example, the write head 15W writes a particular track on the disk 10. The read head 15R reads the data recorded on the disk 10. For example, the read head 15R reads a particular track on the disk 10.

FIG. 2 is a schematic view illustrating an example of an arrangement of the head 15 with respect to the disk 10 according to this embodiment. As illustrated in FIG. 2, in the circumferential direction, the direction in which the disk 10 rotates is referred to as a rotation direction. Incidentally, in the example illustrated in FIG. 2, the rotation direction is illustrated as a counterclockwise direction but may be as an opposite (clockwise) direction.

The head 15 rotates around a rotation axis by the driving of the VCM 14 to move to a particular position from the inward direction to the outward direction with respect to the disk 10 or move from the outer direction to the inner direction.

In the example illustrated in FIG. 2, in the disk 10, the system area 10b is arranged in the outer direction of the user data region 10a. In the example illustrated in FIG. 2, the system area 10b is arranged on the outermost circumference of the disk 10. Incidentally, the system area 10b may be arranged at a position different from the position illustrated in FIG. 2.

The driver IC 20 controls the driving of the SPM 12 and the VCM 14 according to the control of the system controller 130 (specifically, an MPU 60 described later).

The head amplifier IC (preamplifier) 30 includes a read amplifier and a write driver. The read amplifier amplifies a read signal read from the disk 10 and outputs the signal to the system controller 130 (specifically, a read/write (R/W) channel 40 described later). The write driver outputs a write current corresponding to the write data output from the R/W channel 40 to the head 15.

The volatile memory 70 is a semiconductor memory in which stored data is lost when the power supply is cut off. The volatile memory 70 stores data and the like required for processing in each part of the magnetic disk device 1. The volatile memory 70 is, for example, a Dynamic Random Access Memory (DRAM) or a Synchronous Dynamic Random Access Memory (SDRAM).

The non-volatile memory 80 is a semiconductor memory which records data stored even when the power supply is cut off. The non-volatile memory 80 is, for example, a NOR type or NAND type Flash Read Only Memory (flash ROM: FROM).

The buffer memory 90 is a semiconductor memory which temporarily records data and the like transmitted and received between the magnetic disk device 1 and the host 100. Incidentally, the buffer memory 90 may be integrally configured with the volatile memory 70. The buffer memory 90 is, for example, a DRAM, a Static Random Access Memory (SRAM), an SDRAM, a Ferroelectric Random Access memory (FeRAM), a Magnetoresistive Random Access Memory (MRAM), or the like.

The system controller (controller) 130 is realized, for example, by using a large-scale integrated circuit (LSI) which is referred to as a System-on-a-Chip (SoC) in which a plurality of elements are integrated on a single chip. The system controller 130 includes a read/write (R/W) channel 40, a hard disk controller (HDC) 50, a microprocessor (MPU) 60, and the like. The R/W channels 40, the HDC 50, and the MPU 60 are electrically connected to each other. The system controller 130 is electrically connected to, for example, the driver IC 20, the head amplifier IC 30, the volatile memory 70, the non-volatile memory 80, the buffer memory 90, the host system 100, and the like. The R/W channel 40 executes signal processing of data transferred from the disk 10 to the host 100, for example, read data and data transferred from the host 100, for example, write data in response to an instruction from the MPU 60 described later. The R/W channel 40 has a circuit or a function for measuring the signal quality of the read data. The R/W channel 40 is electrically connected to, for example, the head amplifier IC 30, the HDC 50, and the MPU 60.

Hereinafter, in the head 15, the head amplifier IC 30, and the controller 130, a system in which the data read from the disk 10 is transferred to the host 100 may be referred to as a read system.

FIG. 3 is a block diagram illustrating an example of a read system RSYS of the R/W channel 40.

The system controller 130 has the read system RSYS. The R/W channel 40 has a converter 410, an adaptive filter 420, a Viterbi decoder 430, and a Low Density Parity Check (LDPC) unit 440 as the read system RSYS. Incidentally, the system controller 130 may have circuits and the like other than the converter 410, the adaptive filter 420, the Viterbi decoder 430, and the LDPC unit 440 as the read system RSYS. Further, in the system controller 130, the converter 410, the adaptive filter 420, the Viterbi decoder 430, and the LDPC unit 440 may be provided in parts other than the example illustrated in FIG. 3. In the system controller 130, each unit of the read system RSYS, for example, each of the converter 410, the adaptive filter 420, the Viterbi decoder 430, and the LDPC unit 440 executes processing according to the control of the MPU 60.

The converter 410 converts the data input from the head amplifier IC 30 and outputs the converted data to the adaptive filter 420. For example, the converter 410 is an analog-to-digital (AD) converter which converts the analog data input from the head amplifier IC 30 into digital data.

The adaptive filter 420 equalizes the waveform of the data input from the converter 410 and outputs the result to the Viterbi decoder. The adaptive filter 420 is, for example, a Finite impulse response (FIR) filter.

The Viterbi decoder 430 executes Viterbi decoding processing on the data input from the adaptive filter 420 and outputs the data obtained by executing Viterbi decoding processing to the LDPC unit 440.

The LDPC unit 440 executes LDPC processing (or may be referred to as LDPC correction processing) on the data input from the Viterbi decoder 430 and outputs the data obtained by executing the LDPC processing to the HDC 50.

The HDC 50 controls the transfer of data. For example, the HDC 50 controls the transfer of data between the host 100 and the disk 10 in response to the instruction from the MPU 60 described later. The HDC 50 is electrically connected to, for example, the R/W channel 40, the MPU 60, the volatile memory 70, the non-volatile memory 80, and the buffer memory 90.

The MPU 60 is a main controller which controls each unit of the magnetic disk device 1. The MPU 60 controls the VCM 14 via the driver IC 20 and executes servo control for positioning the head 15. The MPU 60 controls the SPM 12 via the driver IC 20 and rotates the disk 10. The MPU 60 controls the operation of writing data to the disk 10 and selects the storage destination of the data transferred from the host 100, for example, the write data. In addition, the MPU 60 controls the operation of reading the data from the disk 10 and controls the processing of the data transferred from the disk 10 to the host 100. The MPU 60 is connected to each unit of the magnetic disk device 1. The MPU 60 is electrically connected to, for example, the driver IC 20, the R/W channel 40, and the HDC 50.

The MPU 60 includes a read/write controller 610, a parity data management unit 620, an error sector detection unit 630, a retry processing unit 640, an error correction unit 650, and a re-assign controller 660. The MPU 60 executes the processing of each unit such as the read/write controller 610, the parity data management unit 620, the error sector detection unit 630, the retry processing unit 640, the error correction unit 650, and the re-assign controller 660 on firmware. Incidentally, the MPU 60 may include each of these units as a circuit. Further, each of the read/write controller 610, the parity data management unit 620, the error sector detection unit 630, the retry processing unit 640, the error correction unit 650, and the re-assign controller 660 may be provided in the R/W channel 40 or the HDC 50.

The read/write controller 610 controls the read processing and write processing of data according to a command from the host 100. The read/write controller 610 controls the VCM 14 via the driver IC 20, positions the head 15 at a particular position on the disk 10, and reads or writes data. For example, the read/write controller 610 seeks the head 15 at a particular radial position (hereinafter referred to as a radial position) at a particular circumferential position (hereinafter referred to as a circumferential position) on the disk 10. The read/write controller 610 positions the head 15 at a particular radial position, writes data to a particular sector, or reads data from a particular sector. Hereinafter, "positioning or arranging the central portion of the head 15 (the write head 15W or the read head 15R) at a particular position" may be simply expressed as "positioning or arranging the head 15 (the write head 15W or the read head 15R) in a particular position". Further, the data to be written to the disk 10 may be referred to as write data, and the data read from the disk 10 may be referred to as read data. Incidentally, the read/write controller 610 may write data in a Shingled Write Magnetic Recording (SMR) (or Shingled Write Recording (SWR)) type in which the next track to be written is overwritten on a radial part of a particular track or may write data in a Conventional Magnetic Recording (CMR) type in which radially adjacent tracks (hereinafter referred to as adjacent tracks) of a particular track are written at particular radial intervals from the particular track.

The parity data management unit 620 calculates the parity data as a result of an Exclusive OR (XOR) operation by executing the XOR operation. The parity data corresponds to, for example, a parity bit and a parity detection code. The parity data management unit 620 manages the parity data calculated by the XOR operation. For example, the parity data management unit 620 executes an XOR operation on the data transferred from the host 100 or the data read from the disk 10 to calculate the parity data. The parity data management unit 620 writes the parity data corresponding to a particular track to a particular sector of the track via the read/write controller 610. Hereinafter, a particular sector of a particular track for writing the parity data corresponding to the track is referred to as a parity sector. In an example, the parity data management unit 620 executes an XOR operation on the data of all sectors read from a particular track or written to a particular track, calculates parity data as a result of the XOR operation corresponding to the data of all sectors, and writes the calculated parity data to the parity sector of this track. The parity data management unit 620 writes each parity data corresponding to each track of the disk 10 to each parity sector corresponding to each track. Incidentally, the parity data management unit 620 may execute an XOR operation on the data of each of some sectors in all sectors of a particular track, calculate the parity data as a result of the XOR operation corresponding to the data of some sectors, and write the calculated parity data to the parity sector of this track. Further, the parity data management unit 620 may record the calculated parity data in a memory such as the user data region 10a, the system area 10b, the volatile memory 70, the non-volatile memory 80, and the buffer memory 90.

The error sector detection unit 630 detects a sector (hereinafter, may be referred to as a read error sector) which cannot be read. In other words, the error sector detection unit 630 detects data (hereinafter, may be referred to as read error data) which cannot be read. The error sector detection unit 630 detects the read error sector based on the detection (inspection) code. In other words, the error sector detection unit 630 detects the read error data written in the read error sector, for example, based on the detection (inspection) code. For example, the error sector detection unit 630 detects the read error sector of a particular track based on the parity inspection code. In other words, the error sector detection unit 630 detects the read error data written in the read error sector of a particular track based on the parity inspection code.

The retry processing unit 640 reads a particular track, a particular sector, or a particular data again (hereinafter, may be referred to as read retry or retry). In the case of detecting a read error sector on a particular track, the retry processing unit 640 read-retries the read error sector (or the track). In other words, in the case of detecting the read error data of the read error sector on a particular track, the retry processing unit 640 read-retries the read error data of the read error sector. For example, until the read error sector of a particular track can be read, the retry processing unit 640 executes read retry in the read error sector (or the track). In other words, until the read error data of the read error sector of the particular track can be read, the retry processing unit 640 executes read retry on the read error data of the read error sector. Further, for example, in a case where a particular number of read retry is executed on a read error sector (or a particular track) of a particular track, the retry processing unit 640 may stop the read retry to the read error sector (or the track). In other words, in a case where a particular number of read retry is executed on the read error data of the read error sector of a particular track, the retry processing unit 640 may stop the read retry to the read error data of the read error sector.

The retry processing unit 640 executes a read retry method (hereinafter, may be referred to as a powerful read retry method) in which a possibility of reading a particular track, a read error sector of the particular track, or read error data of the read error sector is higher than that of a normal read retry which reads again the track, the read error sector, or the read error data, for example, a powerful read retry method using error correction described later on the track, the read error sector, or the read error data. For example, in a case where a read error sector is detected in the initial first round of read processing (initial reading, first reading, or 0-th read retrying) of a particular track, the retry processing unit 640 executes the powerful read retry method on the read error sector in each read processing (or each read retry processing) from the initial reading (or at the 0-th read retrying) of the track to the X (X≥1)-th reading (or the Y (Y≥0)-th read retrying) of the track when the read error sector can be read. In other words, in a case where detects a read error sector of a particular track in the first read, the retry processing unit 640 executes the powerful read retry method on the read error sector every time of reading (hereinafter, may be referred to as one-round read) the track with making a round from the initial reading of the track or read-retrying (hereinafter, may be referred to as a one-round read retry) the track with making a round. Hereinafter, in a command input or instructed from the host 100 or the like, a process of the head 15 reading the track with making a round returning from a particular circumferential position to the circumferential position along the circumferential direction in one direction in order that a powerful read retry method, for example, a retry method using error correction or an error correction is executed on the read error sector detected on the specified track may be referred to as "one-round read". In addition, in a command input or instructed by the host 100 or the like, the process of the head 15 reading a particular track with making a round returning from a particular circumferential position to the circumferential position along the circumferential direction in one direction may be referred to as "one-round read". Incidentally, the retry processing unit 640 may executes the powerful read retry method, for example, a retry method using Averaging or Defect Detector on a particular track, a read error sector of the track, or read error data of the read error sector.

The terms "initial reading (or initial read processing)" and "first reading (or first read processing)" or "0-th read retrying (or 0-th read retry processing)" may include the meaning of "in a command input or instructed by the host 100 or the like, the initial first round of reading (or read processing) or the 0-th read retrying (or read retry processing) after the head 15 is sought from another track, and the head 15 is positioned on the track (hereinafter, may be referred to as a specified track) specified by the command and starts to read the specified track". In other words, the terms "initial reading (or initial read processing)" and "first reading (or first read processing)" or "0-th read retrying (or 0-th read retry processing)" may include the meaning of "in a command input or instructed by the host 100 or the like, the initial first round of reading (or read processing) or the 0-th read retrying (or read retry processing) before the head 15 is sought from another track, and the head 15 is positioned on the track (hereinafter, may be referred to as a specified track) specified by the command and executes read retrying on the specified track".

The terms "X-th reading (or X-th read processing)" or "Y-th read retrying (or Y-th read retry processing)" may include the meaning of "in a command input or instructed by the host 100 or the like, the X-th round of reading (or read processing) of the specified track or the Y-th round of read retrying (or read retry processing) after the head 15 is sought from another track, and the head 15 is positioned on the specified track specified by the command and start to read the specified track". In other words, the terms "X-th reading (or X-th read processing)" or "Y-th read retrying (or Y-th read retry processing)" may include the meaning of "in a command input or instructed by the host 100 or the like, the X-th round of reading (or read processing) of the specified track or the Y-th round of read retrying (or read retry processing) after the head 15 is sought from another track, and the head 15 is positioned on the specified track specified by the command and starts the initial reading before executing read retrying on the specified track".

The error correction unit 650 corrects an error which causes a read error (hereinafter, may be referred to as error correction or correction). The error correction unit 650 executes error correction on the read error sector and corrects the read error sector. In other words, the error correction unit 650 executes error correction on the read error data of the read error sector and corrects the read error data. For example, the error correction unit 650 executes error correction on the read error sector as a powerful read retry method, and corrects the read error sector. In a case where a read error sector is detected, the error correction unit 650 executes error correction on the read error sector and corrects the read error sector. In other words, in a case where a read error sector is detected, the error correction unit 650 executes error correction on the read error data of the read error sector and corrects the read error data. The error correction unit 650 executes error correction on a track-by-track basis, for example. Hereinafter, "track-based error correction" may be simply referred to as "track-based error correction". For example, in a case where a read error sector is detected on a particular track, the error correction unit 650 executes error correction on the read error sector detected on the track based on the error correction code corresponding to the track, and corrects the read error sector of the track. In other words, in a case where the read error data of the read error sector is detected on a particular track, the error correction unit 650 executes error correction on the read error data of the read error sector detected on the track based on the error correction code corresponding to the track, and corrects the read error data of the read error sector of the track. For example, in a case where a read error sector is detected on a particular track, the error correction unit 650 executes error correction on the detected read error sector based on the parity data or the parity code corresponding to the track, and corrects the read error sector of the track. In other words, in a case where the read error data of the read error sector is detected on a particular track, the error correction unit 650 executes error correction on the read error data of the detected read error sector based on the parity data or the parity code corresponding to the track, and corrects the read error data of the read error sector of the track. Incidentally, in a case where a plurality of read error sectors are detected on a particular track, the error correction unit 650 executes error correction on each of the plurality of detected read error sectors based on the parity data or the parity code corresponding to this track, and corrects each of the plurality of pieces of read error data of the track.

For example, in a case where a read error sector is detected during the initial reading of the specified track specified in a command, the error correction unit 650 executes error correction on the detected read error sector based on the parity data corresponding to this specified track, and corrects the read error sector of the specified track. In other words, in a case where the read error data of the read error sector is detected in the initial reading of the specified track specified in a command, the error correction unit 650 executes error correction on the read error data of the detected read error sector based on the parity data corresponding to the specified track, and corrects the read error data of the read error sector of the specified track.

For example, in a case where the read error sector detected on the specified track specified in a command cannot be read, the error correction unit 650 one-round reads the specified track, executes error correction on the read error sector, and corrects the read error sector of the specified track. In other words, for example, in a case where the read error data of the read error sector detected in the specified track specified in a command cannot be read, the error correction unit 650 one-round reads the specified track, executes error correction on the read error data written to the read error sector, and corrects the read error data written in the read error sector of the specified track.

For example, in a case where a read error sector is detected on the specified track specified in a command, the error correction unit 650 repeatedly executes one-round reading (or read retrying) until the read error sector can be read, and executes error correction on the read error sector of the specified track every time of one-round reading (or read retrying) the specified track. In other words, for example, in a case where a read error sector is detected on the specified track specified in a command, the error correction unit 650 repeatedly executes one-round reading (or read retrying) until the read error data of the read error sector can be read, and executes error correction on the read error data of the read error sector of the specified track every time of one-round reading (or read retrying) the specified track.

For example, in a case where a read error sector is detected in the initial reading of the specified track specified in a command, the error correction unit 650 executes error correction on the read error sector from the initial reading, repeatedly executes one-round reading (or one-round read retrying) until the read error sector can be read, and executes error correction on the read error sector of the specified track every time of executing one-round reading (or one-round read retrying) on the specified track. In other words, for example, in a case where read error data of a read error sector is detected in the initial reading of the specified track specified in a command, the error correction unit 650 executes error correction on the read error data of the read error sector from the initial reading, repeatedly executes one-round reading (or one-round read retrying) until the error data of the read error sector can be read, and executes error correction on the read error data of the read error sector of the specified track every time of executing one-round reading (or one-round read retrying) on the specified track.

The re-assign controller 660 re-assigns (or re-assign processing) a particular region (hereinafter, may be referred to as a target region). The re-assign controller 660 re-assigns a target sector (hereinafter, may be referred to as a target sector) of a target track (hereinafter, may be referred to as a target track) or target data (hereinafter, may be referred to as target data). The target track includes, for example, a specified track. The target sector includes, for example, a read error sector. The target data includes, for example, read error data. The re-assigning includes a process of checking (or verifying) whether written/read data can be written/read normally or not (hereinafter, may be referred to as write/read verification or write/read verification processing) and a process of writing the data written in the target region to a region (hereinafter, may be referred to as an alternative region) other than the target region, that is, a process of replacing or rearranging the target sector of the target track with a particular sector (hereinafter, also referred to as an alternative sector) of another track (hereinafter, may be referred to as another track) different from the target track. For example, in the re-assign processing, in a case where the write/read verification (Write&read Verify) cannot be immediately executed at a non-Idle time other than an Idle time, the re-assign controller 660 executes the process of replacing the target sector of the target track with the alternative sector of another track.

The re-assign controller 660 re-assigns the target sector based on the quality (hereinafter, may be referred to as sector quality) of the target sector of the target track. In other words, the re-assign controller 660 re-assigns the target data based on the quality (hereinafter, may be referred to as data quality) of the target data written on the target sector. The re-assign controller 660 checks the sector quality of the target sector of the target track, and re-assigns the target sector based on the sector quality of the target sector. The re-assign controller 660 re-assigns a target sector which is determined to have poor (bad) sector quality due to scratches, pitch unevenness, or the like. In other words, the re-assign controller 660 re-assigns the target data written in the target sector which is determined to have poor (bad) data quality due to scratches, pitch unevenness, or the like. Incidentally, in a case where it is determined that the target track has a plurality of target sectors, the re-assign controller 660 checks the sector quality of the plurality of target sectors of the target track, and re-assigns each of the plurality of target sectors of the target sector based on each sector quality of the plurality of target sectors of the target track.

The re-assign controller 660 determines whether the sector quality of the target sector exceeds a threshold (hereinafter, may be referred to as a sector quality threshold) related to the sector quality of the target sector or is equal to or less than the sector quality threshold, and determines whether to re-assign or not re-assign the target sector according to the determination result. In other words, the re-assign controller 660 determines whether the data quality of the target data written in the target sector exceeds the threshold (hereinafter, may be referred to as a data quality threshold) related to the data quality of the target data or is equal to or lower than the data quality threshold, and determines whether or not re-assign or not re-assign the target data according to the determination result. For example, in a case where it is determined that the sector quality of the target sector is equal to or less than the sector quality threshold corresponding to the target sector, the re-assign controller 660 determines that the sector quality of the target sector is not excellent and re-assigns the target sector. In other words, in a case where it is determined that the data quality of the target data written in the target sector is equal to or less than the data quality threshold corresponding to the target data, the re-assign controller 660 determines that the data quality of the target data is not excellent and re-assigns the target data. For example, in a case where it is determined that the sector quality of the target sector exceeds the sector quality threshold corresponding to the target sector, the re-assign controller 660 determines that the sector quality of the target sector is excellent and does not re-assign the target sector. In other words, in a case where it is determined that the data quality of the target data written in the target sector exceeds the data quality threshold corresponding to the target data, the re-assign controller 660 determines that the data quality of the target data is excellent and does not re-assign the target data. Incidentally, in a case where it is determined that the sector quality of the target sector is equal to or less than the sector quality threshold corresponding to the target sector, the re-assign controller 660 may determine that the sector quality of the target sector is excellent and may not re-assign the target sector. In other words, in a case where it is determined that the data quality of the target data written in the target sector is equal to or less than the data quality threshold corresponding to the target data, the re-assign controller 660 may determine that the data quality of the target data is excellent and may not re-assign the target data. For example, in a case where it is determined that the sector quality of the target sector exceeds the sector quality threshold corresponding to the target sector, the re-assign controller 660 may determine that the sector quality of the target sector is not excellent and may re-assign the target sector. In other words, in a case where it is determined that the data quality of the target data written in the target sector exceeds the data quality threshold corresponding to the target data, the re-assign controller 660 may determine that the data quality of the target data is not excellent and may re-assign the target data.

Based on the sector quality of the read error sector (hereinafter, also referred to as a recovery sector or a relief sector) which can be read by executing the powerful read retry method, the re-assign controller 660 re-assigns the recovered sector. In other words, based on the data quality of the read error data (hereinafter, may be referred to as recovery data or relief data) of the read error sector which can be read by executing the powerful read retry method, the re-assign controller 660 re-assigns the recovery data.

For example, based on the sector quality of the read error sector (hereinafter, also referred to as a recovery sector or a relief sector) which can be recovered or relieved to be readable by executing error correction, the re-assign controller 660 re-assigns the recovered sector (or the relief sector). In other words, based on the data quality of the read error data (hereinafter, may be referred to as recovery data or relief data) of the recovery sector (or the relief sector) which can be recovered or relieved to be readable by executing error correction, the re-assign controller 660 re-assigns the recovery data.

In a case where the read error sector detected in the initial reading of the target track is recovered or relieved at the A ($1 \leq A \leq X$)-th read {B ($0 \leq B \leq Y$)-th read retry} from the initial reading (or the 0-th read retry) to the X-th reading (or the Y-th read retrying) by the powerful read retry method, based on the sector quality of a recovery sector (or a relief sector), the re-assign controller 660 re-assigns the recovery sector (or the relief sector). In other words, in a case where the read error data of the read error sector detected in the initial reading of the target track is recovered or relieved at the A ($1 \leq A \leq X$)-th read {B ($0 \leq B \leq Y$)-th read retry} from the initial reading (or the 0-th read retrying) to the X-th reading (or the Y-th read retrying) by the powerful read retry method, based on the data quality of recovery data (or relief data) of the recovery sector (or the relief sector), the re-assign controller 660 re-assigns the recovery data (or the relief data) of the recovery sector (or the relief sector).

For example, in a case where the read error sector detected in the initial reading of the target track can be recovered or relieved at the initial reading by the powerful read retry method, based on the sector quality of a recovery sector (or a relief sector), the re-assign controller 660 re-assigns the recovery sector (or the relief sector). In other words, in a case where the read error data of the read error sector detected in the initial reading of the target track can be recovered or relieved at the initial reading by the powerful read retry method, based on the data quality of recovery data (or relief data) of the recovery sector (or the relief sector), the re-assign controller 660 re-assigns the recovery sector (or the relief sector).

In a case where the read error sector detected in the initial reading of the target track is recovered or relieved at one-round reading (or one-round read retrying) within a particular number of times (hereinafter, also referred to as a round threshold) by the powerful read retry method, based on the sector quality of a recovery sector (or a relief sector), the re-assign controller 660 re-assigns the recovery sector (or the relief sector). In other words, in a case where the read error data of the read error sector detected in the initial reading of the target track is recovered or relieved at one-round reading (or one-round read retrying) within the round threshold by the powerful read retry method, based on the data quality of recovery data (or relief data) of the recovery sector (or the relief sector), the re-assign controller 660 re-assigns the recovery data (or relief data) of the recovery sector (or the relief sector).

For example, only in a case where the read error sector detected in the initial reading of the target track is recovered or relieved at one-round reading (or one-round read retrying) within the round threshold from the initial reading by the powerful read retry method, based on the sector quality of a recovery sector (or a relief sector), the re-assign controller 660 re-assigns the recovery sector (or the relief sector). In other words, only in a case where the read error data of the read error sector detected in the initial reading of the target track is recovered or relieved at one-round reading (or one-round read retrying) within the round threshold from the initial reading by the powerful read retry method, based on the data quality of a recovery sector (or a relief sector), the re-assign controller 660 re-assigns the recovery data (or relief data) of the recovery sector (or the relief sector).

In an example, only in a case where the read error sector detected in the initial reading of the target track is recovered or relieved at one-round reading (or one-round read retrying) within zero to three rounds from the initial reading by the powerful read retry method, based on the sector quality of a recovery sector (or a relief sector), the re-assign controller 660 re-assigns the recovery sector (or the relief sector). In other words, only in a case where the read error data of the read error sector detected in the initial reading of the target track is recovered or relieved at one-round reading (or one-round read retrying) within zero to three rounds from the initial reading by the powerful read retry method, based on the data quality of a recovery sector (or a relief sector), the re-assign controller 660 re-assigns the recovery data (or relief data) of the recovery sector (or the relief sector).

The re-assign controller 660 determines whether the sector quality of the recovery sector exceeds the sector quality threshold corresponding to the recovery sector or is equal to or less than the sector quality threshold, and determines whether to re-assign or not to re-assign the recovery sector according to the determination result. In other words, the re-assign controller 660 determines whether the data quality of the recovery data written to the recovery sector exceeds the data quality threshold corresponding to the recovery data or is equal to or less than the data quality threshold, and determines whether to re-assign or not re-assign the recovery data according to the determination result. For example, in a case where it is determined that the sector quality of the recovery sector is equal to or less than the sector quality threshold corresponding to the recovery sector, the re-assign controller 660 determines that the sector quality of the recovery sector is not excellent and re-assigns the recovery sector. In other words, in a case where it is determined that the data quality of the recovery data written in the recovery sector is equal to or less than the data quality threshold, the re-assign controller 660 determines that the data quality of the recovery data written in the recovery sector is not excellent and re-assigns the recovery data. For example, in a case where it is determined that the sector quality of the recovery sector exceeds the sector quality threshold corresponding to the recovery sector, the re-assign controller 660 determines that the sector quality of the recovery sector is excellent and does not re-assign the recovery sector. In other words, in a case where it is determined that the data quality of the recovery data written in the recovery sector exceeds the data quality threshold corresponding to the recovery data, the re-assign controller 660 determines that the data quality of the recovery data written in the recovery sector is excellent and does not re-assign the recovery data. For example, in a case where it is determined that the sector quality of the recovery sector is equal to or less than the sector quality threshold corresponding to the recovery sector, the re-assign controller 660 may determine that the sector quality of the recovery sector is excellent and may not re-assign the recovery sector. In other words, in a case where it is determined that the data quality of the recovery data written in the recovery sector is equal to or less than the data quality threshold, the re-assign controller 660 may determine that the data quality of the recovery data written in the recovery sector is excellent and may not re-assigns the recovery data. For example, in a case where it is determined that the sector quality of the recovery sector exceeds the sector quality threshold corresponding to the recovery sector, the re-assign controller 660 may determine that the sector quality of the recovery sector is not excellent and may re-assign the recovery sector. In other words, in a case where it is determined that the data quality of the recovery data written in the recovery sector exceeds the data quality threshold corresponding to the recovery data, the re-assign controller 660 may determine that the data quality of the recovery data written in the recovery sector is not excellent and may re-assign the recovery data.

For example, in a case where error correction is executed on the target sector, based on the number (hereinafter, may be referred to as a total bit correction number) of error-corrected bits among all the bits of the data corresponding to the target sector counted by the R/W channel 40 or the like, the re-assign controller 660 determines the sector quality of the target sector. For example, in a case where error correction is executed on the target sector, the re-assign controller 660 executes one-round reading on the target track and executes error correction on the target sector of the target track before executing the LDPC correction processing. The re-assign controller 660 compares all bits (hereinafter, may be referred to as all before-correction bits) corresponding to the data of the target sector before executing the error correction with all bits (hereinafter, may be referred to as all after-correction bits) corresponding to the data of the target sector after executing the error correction, and counts the total bit correction number as the bits obtained by error-correcting the bits changed between the all before-correction bits and the all after-correction bits. The re-assign controller 660 determines that the sector quality of a particular sector is not excellent as the total bit correction number is larger, and determines that the sector quality of a particular sector is excellent as the total bit correction number is smaller. For example, in a case where the total bit correction number corresponding to the target sector is larger than the threshold (hereinafter, may be referred to as a bit threshold), the re-assign controller 660 determines that the sector quality of the target sector is not excellent. Further, in a case where the total bit correction number corresponding to the target sector is equal to or less than the bit threshold, the re-assign controller 660 determines that the sector quality of the target sector is excellent.

For example, in a case where error correction is executed on a target sector, the re-assign controller 660 determines the sector quality of the target sector based on the LDPC unsatisfied Parity Check corresponding to the target sector. LDPC is configured by a plurality of Parity Check Codes. In a case where all the Parity Checks of the LDPC corresponding to the data of the target sector are satisfied, the re-assign controller 660 considers that all the errors of the target sector are corrected. That is, the re-assign controller 660 determines the sector quality of the target sector based on the number of satisfied Parity Checks or the number of unsatisfied Parity Checks among all the Parity Checks of the LDPC corresponding to the data of the target sector. For example, in a case where error correction is executed on the target sector, the re-assign controller 660 one-round reads the target track and determines the sector quality of the target sector based on the number of unsatisfied Parity Checks corresponding to the target sector of the target track.

For example, in a case where error correction is executed on the target sector, the re-assign controller 660 determines the sector quality of the target sector based on a metric difference (hereinafter, simply may be referred to as metric difference) between a selection path and a competition path in the Viterbi path metric of the Viterbi decoding processing for the data of the target sector. In the Viterbi decoding processing, the path with the smaller metric is selected, and thus the possibility of selecting a wrong path decreases when the metric difference increases. The re-assign controller 660 determines that the sector quality of the target sector is excellent as the metric difference is larger, and determines that the sector quality of the target sector is not excellent as the metric difference is smaller. For example, in a case where the metric difference corresponding to the data of the target sector is larger than the threshold (hereinafter, may be referred to as a metric difference threshold), the re-assign controller 660 determines that the sector quality of the target sector is excellent. Further, in a case where it is determined that the metric difference corresponding to the data of the target sector is equal to or less than the metric difference threshold, the re-assign controller 660 determines that the sector quality of the target sector is not excellent.

For example, in a case where error correction is executed on the target sector, the re-assign controller 660 determines the sector quality of the target sector based on a drop in the waveform (or the amplitude of waveform) of the data obtained by reading the target sector. The re-assign controller 660 has a function (hereinafter, may be referred to as a waveform drop detection function) of detecting the drop in the waveform of the target data when the target sector is read. In a case where it is determined that a section in which the drop in the waveform of the target data when the target sector is read is equal to or less than the threshold (hereinafter, may be referred to as a waveform drop threshold) is equal to or greater than a particular interval (hereinafter, referred to as a waveform drop section threshold), the re-assign controller 660 determines that the region of the disk 10 corresponding to the target sector is defective. For example, in a case where it is determined that the section in which the drop in the waveform of the target data when the target sector is read is equal to or less than the waveform drop threshold is equal to or greater than the waveform drop section threshold, the re-assign controller 660 determines that the sector quality of the target sector is not excellent. For example, in a case where it is determined that the section in which the drop in the waveform of the target data when the target sector is read is equal to or less than the waveform drop threshold is less than the waveform drop section threshold, the re-assign controller 660 determines that the sector quality of the target sector is excellent.

FIG. 4 is a schematic diagram illustrating an example of a method of the error correction in track units according to this embodiment.

FIG. 4 illustrates a track TRe. The track TRe may be a track written by the shingled write magnetic recording type in a particular band region, or may be a track written by the conventional magnetic recording type. In FIG. 4, the track TRe is concentric with the disk 10, but may have a shape other than a circular shape. The track TRe includes sectors Se0, Se1, Se2, Se3, Se4, Se5, Se6, Se7, Se8, Se9, Se10, Se11, Se12, Se13, and Se14 and a parity sector PSe. Incidentally, the track TRe may further include other sectors, and may not include some sectors in the sectors Se0 to Se14. In FIG. 4, the sector Se10 is a read error sector. As illustrated in FIG. 4, in the circumferential direction, a direction in which data is written and read is referred to as a traveling direction. For example, the traveling direction is opposite to the rotation direction of the disk 10. Incidentally, the traveling direction may be the same as the rotation direction of the disk 10. In FIG. 4, the traveling direction corresponds to a direction in which the head 15 positioned on the track TRe writes or reads the sectors Se0, Se1, Se2, Se3, Se4, Se5, Se6, Se7, Se8, Se9, Se10, Se11, Se12, Se13, and Se14 in the order.

The MPU 60 initially writes user data to the sector Se0 in the track TRe, for example. The MPU 60 writes the user data from the sector Se0 to the sector Se14 along the traveling direction.

The MPU 60 executes an XOR operation on a plurality of pieces of user data corresponding to respective sectors Se0 to Se14, and calculates parity data as a result of the XOR operation on the plurality of pieces of user data corresponding to respective sectors Se0 to Se14.

The MPU 60 writes the parity data corresponding to the plurality of pieces of data corresponding to respective sectors Se0 to Se14 to the parity sector PSe positioned (adjacent) next in the traveling direction to the sector Se14 where the last user data is written in the track TRe.

The MPU 60 reads data from the sector Se0 to the sector Se14 along the traveling direction.

The MPU 60 detects the read error data of the read error sector Se10 and corrects the read error data written in the read error sector Se10 based on the parity data written in the parity sector PSe.

FIG. 5 is a diagram illustrating an example of read processing without read retry. FIG. 5 illustrates a particular track TRn in the user data region 10a.

In the example illustrated in FIG. 5, according to a command input or instructed from the host 100 or the like, the MPU 60 seeks the head 15 from another track to a circumferential position CP1 of the track TRn specified by the command. In other words, according to a command input or instructed from the host 100 or the like, the MPU 60 seeks the head 15 from another track to the sector corresponding to the circumferential position CP1 of the track TRn specified by the command. Hereinafter, when, in a command input or instructed by the host 100 or the like, the head 15 is sought from another track to the track specified by this command, and the head 15 is initially arranged at a circumferential position on the track TRn specified by this command, the circumferential position may be referred to as a base point. The MPU 60 reads the region from the circumferential position CP1 (base point BP1) to a circumferential position CP2 of the track TRn specified by the command input or instructed from the host 100 or the like. In other words, the MPU 60 reads a plurality of sectors from the sector corresponding to the circumferential position CP1 of the track TRn specified in the command input or instructed from the host 100 or the like to the sector corresponding to the circumferential position CP2. Hereinafter, when, in a command input or instructed by the host 100 or the like, a particular region of the track specified by this command is read from another track, and the head 15 is started at a circumferential position to be sought from the track specified by this command to another track, the circumferential position may be referred to as an end point. In a case where a read error sector is not detected in the region from the circumferential position CP1 (base point BP1) to the circumferential position CP2 (end point EP1) of the track TRn, the MPU 60 does not retry the track TRn but seeks another track from the circumferential position CP2 (end point EP1) of the track TRn. In other words, in a case where a read error sector is not detected in a plurality of sectors from the sector corresponding to the circumferential position CP1 (base point BP1) of the track TRn to the sector corresponding to the circumferential position CP2 (end point EP1), the MPU 60 does not retry the track TRn but seeks another track from the sector corresponding to the circumferential position CP2 (end point EP1) of the track TRn.

Figure 6:
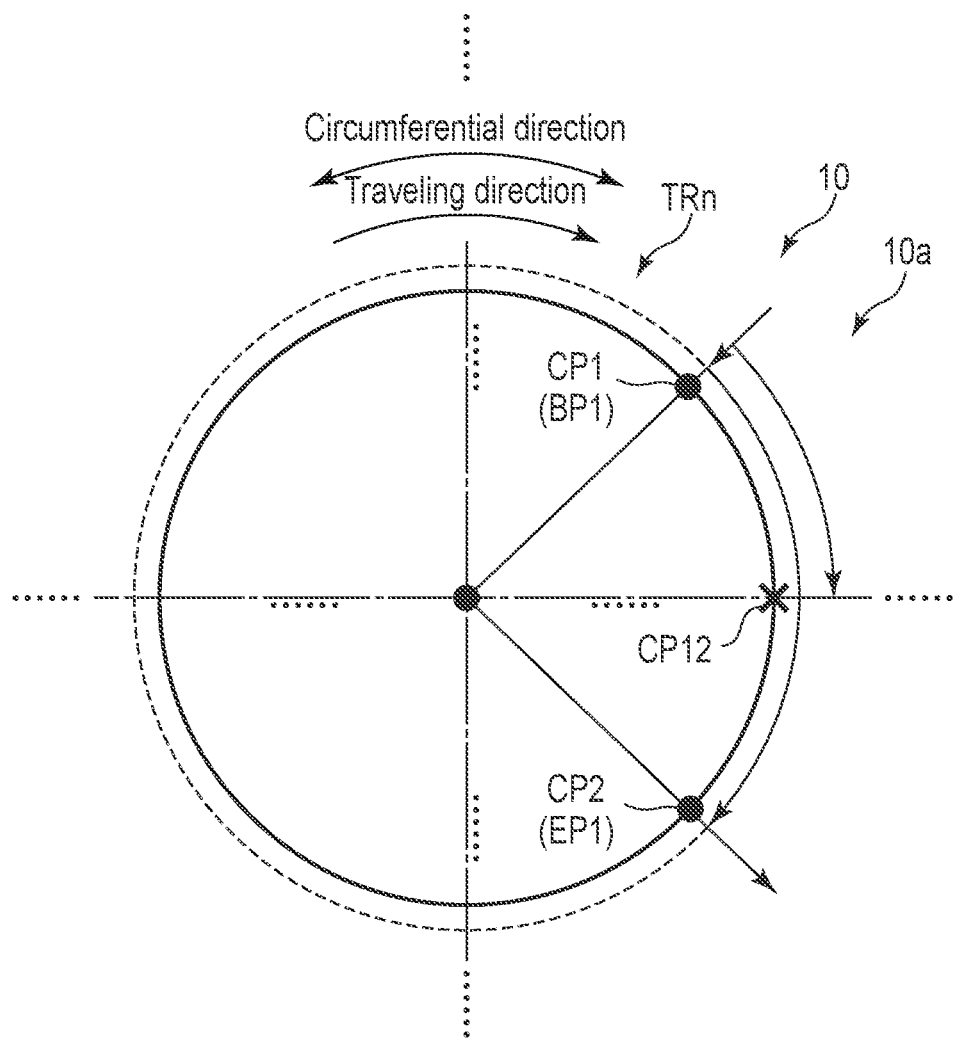
FIG. 6 is a diagram illustrating an example of read processing accompanied by read retry.

FIG. 6 is a diagram illustrating an example of read processing accompanied by read retry. FIG. 6 corresponds to FIG. 5.

In the example illustrated in FIG. 6, the MPU 60 seeks the head 15 from another track to the circumferential position CP1 (base point BP1) of the track TRn specified by this command according to the command input or instructed by the host 100 or the like. In other words, according to a command input or instructed from the host 100 or the like, the MPU 60 seeks the head 15 from another track to the sector corresponding to the circumferential position CP1 (base point BP1) of the track specified by the command. The MPU 60 reads the region from the circumferential position CP1 (base point BP1) to a circumferential position CP2 (end point EP1) of the track TRn specified by the command input from the host 100 or the like in the traveling direction. In other words, the MPU 60 reads a plurality of sectors from the sector corresponding to the circumferential position CP1

(base point BP1) of the track TRn specified in the command input or instructed from the host 100 or the like to the sector corresponding to the circumferential position CP2 (end point EP1) in the traveling direction. The MPU 60 detects a read error sector at the circumferential position CP12 in the region from the circumferential position CP1 (base point BP1) to the circumferential position CP2 (end point EP1) of the track TRn. In other words, the MPU 60 detects, as the read error sector, the sector corresponding to the circumferential position CP12 among a plurality of sectors from the sector corresponding to the circumferential position CP1 (base point BP1) of the track TRn to the sector corresponding to the circumferential position CP2 (EP1). In a case where the read error sector is detected at the circumferential position CP12 in the region from the circumferential position CP1 (base point BP1) to the circumferential position CP2 (end point EP1) of the track TRn, the MPU 60 executes error correction on the read error sector based on the parity data corresponding to the track TRn. In other words, in a case where the sector corresponding to the circumferential position CP12 among the plurality of sectors from the sector corresponding to the circumferential position CP1 (base point BP1) of the track TRn to the sector corresponding to the circumferential position CP2 (end point EP1) is detected as the read error sector, the error correction is executed on the read error sector based on the parity data corresponding to the track TRn. In a case where the read error sector cannot be recovered or relieved by the error correction, in order to execute the error correction again on the read error sector, the MPU 60 further reads (read-retries) from the circumferential position CP2 (end point EP1) to the circumferential position CP12 in the traveling direction and one-round reads (one-round read retries) the track TRn from the circumferential position CP12 to the circumferential position CP12 in the traveling direction. In other words, in a case where the read error sector cannot be recovered or relieved by the error correction, in order to execute the error correction again on the read error sector, the MPU 60 further reads (read-retries) from the sector corresponding to the circumferential position CP2 (end point EP1) to the sector corresponding to the circumferential position CP12 in the traveling direction and one-round reads (one-round read retries) a plurality of sectors of the track TR from the sector corresponding to the circumferential position CP12 to the sector corresponding to the circumferential position CP12 in the traveling direction. In a case where the track TR is one-round read (one-round read retried) from the circumferential position CP12 to the circumferential position CP12 in the traveling direction, the MPU 60 executes error correction again on the read error sector (the sector corresponding to the circumferential position CP12) based on the parity data corresponding to the track TRn to correct the read error sector of the track. In other words, in a case where the plurality of sectors of the track TRn from the sector corresponding to the circumferential position CP12 to the sector corresponding to the circumferential position CP12 are one-round read (one-round read retried) in the traveling direction, the MPU 60 executes error correction again on the read error sector (the sector corresponding to the circumferential position CP12) based on the parity data corresponding to the track TRn to correct the read error sector of the track.

FIG. 7 is a schematic diagram illustrating an example of the re-assign. FIG. 7 illustrates the tracks TRn and TRk. In FIG. 7, the track TRn has sectors Sn1, Sn2, Sn3, Sn4, Sn5, Sn6, Sn7, Sn8, Sn9, Sn10, Sn11, Sn12, Sn13, and Sn14, and a parity sector PSn. The sectors Sn1, Sn2, Sn3, Sn4, Sn5, Sn6, Sn7, Sn8, Sn9, Sn10, Sn11, Sn12, Sn13, and Sn14 are arranged in the circumferential direction in the order described. The parity sector PSn is adjacent to the sector Sn14 on the opposite side of the sector Sn13 in the circumferential direction. The parity data calculated as a result of the XOR operation on the data of sectors Sn1 to Sn14 is written in the parity sector PSn. In FIG. 7, the sector Sn10 corresponds to a recovery sector Sn10. The track TRk has a plurality of sectors.

The MPU 60 re-assigns the recovery sector Sn10 based on the sector quality of the recovery sector Sn10 on the track TRn. In the example illustrated in FIG. 7, in a case where the write/read verification (Write&read Verify) cannot be executed immediately at the non-Idle time or the like other than the idle time when the recovery sector Sn10 of the track TRn is re-assigned, the MPU 60 writes and replaces the recovery sector Sn10 with an alternative sector of the track TRk.

Figures 8, 9:
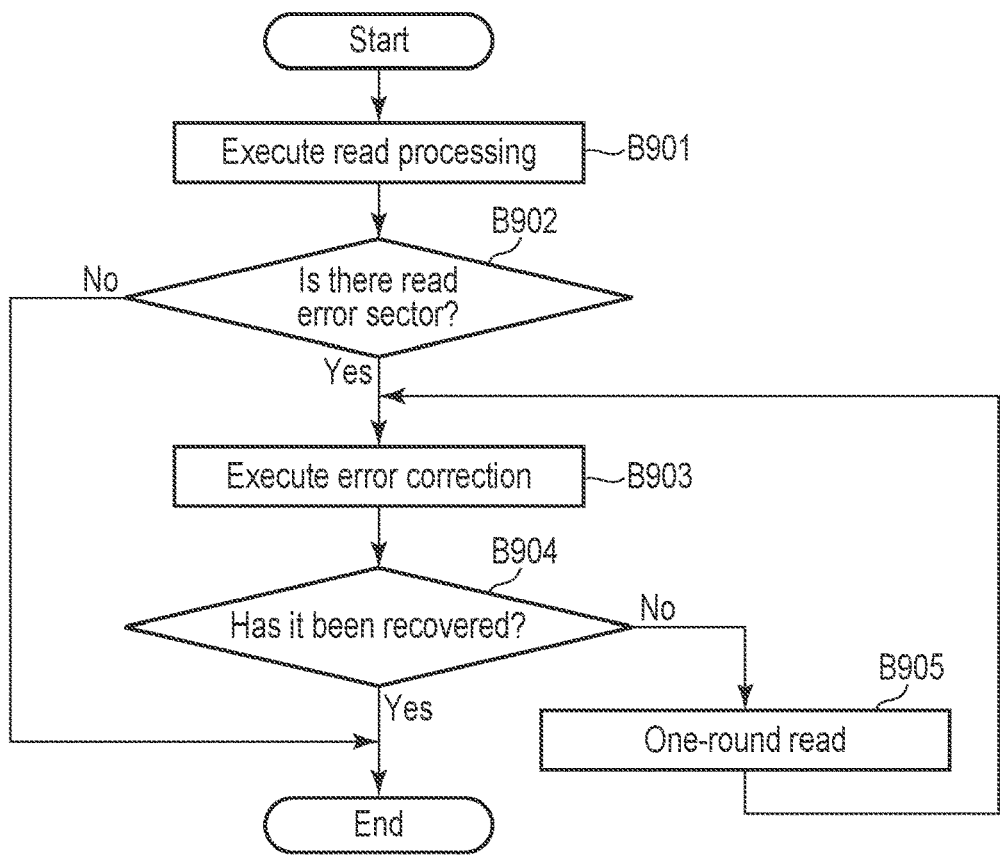
FIG. 8 is a schematic diagram illustrating an example of a table showing the relationship between a read retry, a powerful read retry method, and the re-assign.
FIG. 9 is a flowchart illustrating an example of an error correction processing method according to the first embodiment.

FIG. 8 is a schematic diagram illustrating an example of a table TB showing the relationship between the read retry, the powerful read retry method, and the re-assign. The table TB of FIG. 8 includes an item of Retry Step corresponding to the number of read retries for a particular region, for example, a particular sector, an item of Read off-set corresponding to a radial deviation from a radial position (hereinafter sometimes referred to as a read target position) which is a target when the sector is read, an item of Read Retry indicating whether or not to execute a powerful read retry method, and an item of Re-Assign indicating whether or not to execute re-assign processing in a case where a particular sector can be recovered or relieved. In the table TB of FIG. 8, a case where the item of Retry Step is 0 corresponds to the initial reading. In the table TB of FIG. 8, a case where the item of Read Retry is Yes indicates that the powerful read retry is executed or implemented, and a case where the item of Read Retry is NO indicates that the powerful read retry is not executed or implemented. In the table TB of FIG. 8, a case where the item of Re-Assign is Yes indicates that the re-assign is executed or implemented, and a case where the item of Re-Assign is NO indicates that the re-assign is not executed or implemented. In the table TB of FIG. 8, in a case where the items of Retry Step are 0, 1, 2, and 3, the item of Read off-set is 0. In the table TB of FIG. 8, in a case where the item of Retry Step is 4, the item of Read off-set is ±CS1. In the table TB of FIG. 8, in a case where the item of Retry Step is 5, the item of Read off-set is ±CS2. In the table TB of FIG. 8, in a case where the item of Retry Step is 6, the item of Read off-set is ±CS3. In the table TB of FIG. 8, in a case where the items of Retry Step are 0, 1, 2, and 3, the item of Re-Assign is YES. The table TB of FIG. 8 may be held in a particular recording region such as the system area 10b of the disk 10, the volatile memory 70, the non-volatile memory 80, and the buffer memory 90.

In a case where the item of Retry Step is 0, and a read error sector is detected in the target track, the MPU 60 executes error correction as the powerful read retry method on the read error sector. In a case where the item of Retry Step is 0, and the read error sector can be recovered by executing error correction on the read error sector detected on the target track, the MPU 60 re-assigns the recovery sector based on the sector quality of the recovery sector corresponding to the read error sector.

In a case where the item of Retry Step is 0, and a read error sector is detected in the target track, the MPU 60 executes error correction as the powerful read retry method on the read error sector. In a case where the item of Retry Step is 0, and the read error sector can be recovered by executing error correction on the read error sector detected on the target track, the MPU 60 re-assigns the recovery sector based on the sector quality of the recovery sector corresponding to the read error sector.

In a case where the item of Retry Step is 1, and a read error sector is detected in the target track, the MPU 60 executes error correction as the powerful read retry method on the read error sector. In a case where the item of Retry Step is 1, and the read error sector can be recovered by executing error correction on the read error sector detected on the target track, the MPU 60 re-assigns the recovery sector based on the sector quality of the recovery sector corresponding to the read error sector.

In a case where the item of Retry Step is 2, and a read error sector is detected in the target track, the MPU 60 executes error correction as the powerful read retry method on the read error sector. In a case where the item of Retry Step is 2, and the read error sector can be recovered by executing error correction on the read error sector detected on the target track, the MPU 60 re-assigns the recovery sector based on the sector quality of the recovery sector corresponding to the read error sector.

In a case where the item of Retry Step is 3, and a read error sector is detected in the target track, the MPU 60 executes error correction as the powerful read retry method on the read error sector. In a case where the item of Retry Step is 3, and the read error sector can be recovered by executing error correction on the read error sector detected on the target track, the MPU 60 re-assigns the recovery sector based on the sector quality of the recovery sector corresponding to the read error sector.

In a case where the item of Retry Step is 4, and a read error sector is detected in the target track, the MPU 60 executes error correction as the powerful read retry method on the read error sector. In a case where the item of Retry Step is 4, and the read error sector can be recovered by executing error correction on the read error sector detected on the target track, the MPU 60 re-assigns the recovery sector based on the sector quality of the recovery sector corresponding to the read error sector.

In a case where the item of Retry Step is 5, and a read error sector is detected in the target track, the MPU 60 executes error correction as the powerful read retry method on the read error sector. In a case where the item of Retry Step is 5, and the read error sector can be recovered by executing error correction on the read error sector detected on the target track, the MPU 60 re-assigns the recovery sector based on the sector quality of the recovery sector corresponding to the read error sector.

In a case where the item of Retry Step is 6, and a read error sector is detected in the target track, the MPU 60 executes error correction as the powerful read retry method on the read error sector. In a case where the item of Retry Step is 6, and the read error sector can be recovered by executing error correction on the read error sector detected on the target track, the MPU 60 re-assigns the recovery sector based on the sector quality of the recovery sector corresponding to the read error sector.

Assuming that the read error sector is corrected by error correction from the initial reading, the recording density of the disk 10, for example, a Track Per Inch (TPI) can be set without margin. In this case, a sector recoverable or relievable only by the error correction function is generated due to Drift-off-Write (DOW) or the like. Therefore, in such a magnetic disk device, in a case where the initial reading or the item of Retry Step is 0, or at least the item of Retry Step is 1, 2, or 3, it is necessary to execute error correction (or implement an error correction code). In this way, even in a case where the item of Retry Step (Retry Step) is small, when error correction is executed, even data written to poor quality sectors which cannot be read due to scratches, pitch unevenness, and the like can be recovered or relieved when the Retry Step is small. Thus, it may be necessary to execute re-assigning based on the sector quality of the sector regardless of the size (or number of times) of the Retry Step.

FIG. 9 is a flowchart illustrating an example of an error correction processing method according to this embodiment.

The MPU 60 reads the target track according to the command input from the host 100 or the like (B901). The MPU 60 determines whether the target track has a read error sector or no read error sector (B902). In a case where it is determined that there is no read error sector (NO in B902), the MPU 60 ends the processing. In a case where it is determined that there is a read error sector (YES in B902), the MPU 60 executes the powerful read retry method, for example, error correction, on the read error sector based on the parity data corresponding to the target track or the like (B903). For example, in a case where it is determined that there is a read error sector at the time of the initial reading of the target track, the MPU 60 executes the powerful read retry method, for example, error correction on the read error sector based on the parity data corresponding to the target track or the like. The MPU 60 determines whether the read error sector has been recovered or not (B904). In a case where it is determined that the read error sector has not been recovered (NO in B904), the MPU 60 one-round reads (or one-round read retries) the target track (B905) and proceeds to the process of B903. In a case where it is determined that the read error sector has been recovered by error correction (YES in B904), the MPU 60 ends the processing.

Figure 10:
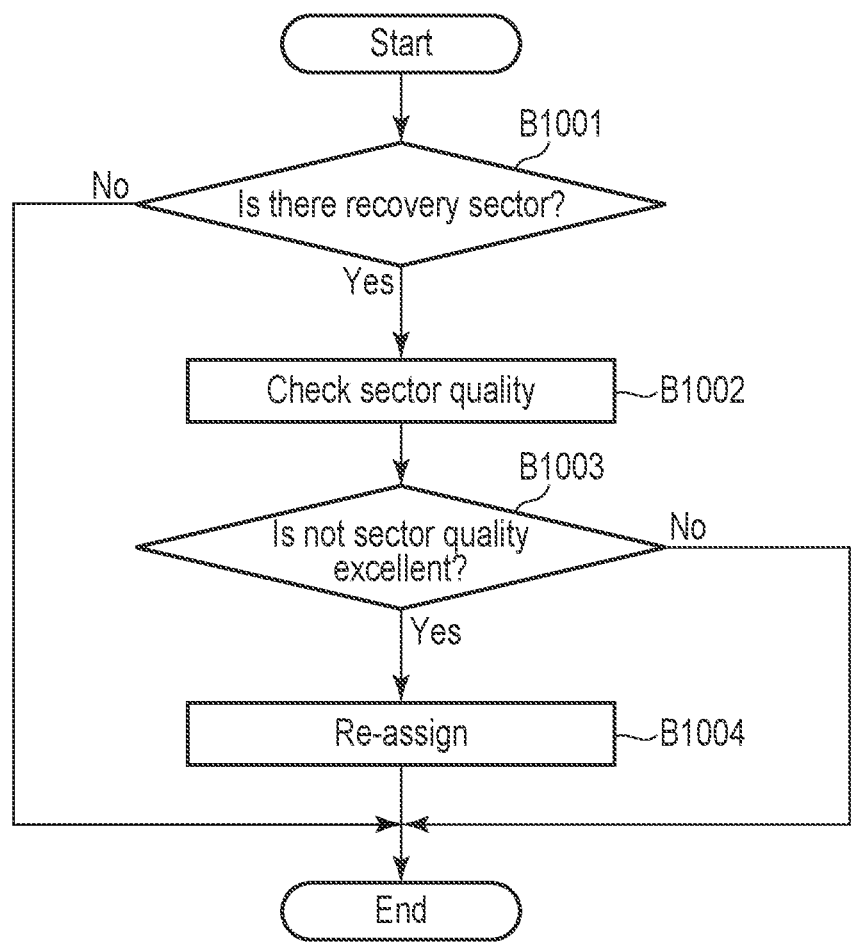
FIG. 10 is a flowchart illustrating an example of a re-assign processing method according to the first embodiment.

FIG. 10 is a flowchart illustrating an example of a re-assign processing method according to this embodiment.

The MPU 60 determines whether there is a recovery sector (or relief sector) recovered or relieved by the powerful read retry method, for example, error correction (B1001). In a case where it is determined that there is no recovery sector (NO in B1001), the MPU 60 checks the sector quality of the recovery sector (B1002) and determines whether the sector quality of this recovery sector is not excellent (poor) or excellent (B1003). In a case where it is determined that the sector quality of the recovery sector is excellent (NO in B1003), the MPU 60 ends the processing. In a case where it is determined that the sector quality of the recovery sector is not excellent (poor) (YES in B1003), the MPU 60 re-assigns the recovery sector (B1004) and ends the processing. That is, the MPU 60 can execute re-assigning from the initial reading of the target track to the recovery sector of the target track.

According to this embodiment, in a case where a read error sector is detected in the track specified by the command input from the host 100 or the like, the magnetic disk device 1 executes the powerful read retry method, for example, the error correction on the read error sector from the initial reading of the read error sector. In a case where the read error sector can be recovered, the magnetic disk device 1 checks the sector quality of the recovered read error sector (recovery sector). The magnetic disk device 1 determines whether the sector quality of the recovery sector is not excellent or excellent. In a case where it is determined that the sector quality of the recovery sector is not excellent (poor), the magnetic disk device 1 re-assigns the recovery sector. The magnetic disk device 1 may execute re-assigning on the read error sector (recovery sector) within a plurality of times of read retries from the initial reading. In a case where a sector recoverable only by the error correction is generated due to DOW or the like, the magnetic disk device 1 corrects the read error sector by error correction from the initial reading. For this reason, the magnetic disk device 1 can increase the TPI of the disk 10. Therefore, the magnetic disk device 1 can improve the recording density.

Next, the magnetic disk device according to a modification will be described. In the modification, the same parts as those in the above-described embodiment are designated by the same reference numerals, and detailed description thereof will be omitted.

(First Modification)

A magnetic disk device 1 according to a first modification has a parity sector generation method different from that of the magnetic disk device 1 of the first embodiment.

An MPU 60 re-assigns the target sector based on the sector quality of the target sector of the target track. In a case where the write/read verification (Write&read Verify) cannot be immediately executed at the non-Idle time other than the Idle state when the target sector of the target track is re-assigned, the MPU 60 replaces the target sector with an alternative sector of another track. In a case where the target sector is replaced with the alternative sector by re-assigning, the MPU 60 calculates the parity data as a result of the XOR operation corresponding to each sector of the target track other than the target sector and the alternative sector. That is, in a case where the target sector is replaced with the alternative sector by re-assigning, the MPU 60 generates the parity sector based on the XOR operation corresponding to each sector of the target track other than the target sector and the alternative sector. In other words, in a case where the target sector is replaced with the alternative sector by re-assigning, the MPU 60 generates, over a plurality of tracks, the parity sector based on the result of the XOR operation corresponding to each sector of the target track other than the target sector and the alternative sector.

For example, the MPU 60 re-assigns the recovery sector based on the sector quality of the recovery sector of the target track. In a case where Write&read Verify cannot be immediately executed at the non-Idle time or the like when the recovery sector of the target track is re-assigned, the MPU 60 replaces the recovery sector with an alternative sector of another track. In a case where the recovery sector is replaced with the alternative sector by re-assigning, the MPU 60 calculates the parity data as a result of the XOR operation corresponding to each sector of the target track other than the recovery sector and the alternative sector. That is, in a case where the recovery sector is replaced with the alternative sector by re-assigning, the MPU 60 generates the parity sector based on the XOR operation corresponding to each sector of the target track other than the recovery sector and the alternative sector. In other words, in a case where the recovery sector is replaced with the alternative sector by re-assigning, the MPU 60 generates, over a plurality of tracks, the parity sector based on the result of the XOR operation corresponding to each sector of the target track other than the recovery sector and the alternative sector.

Figure 11:
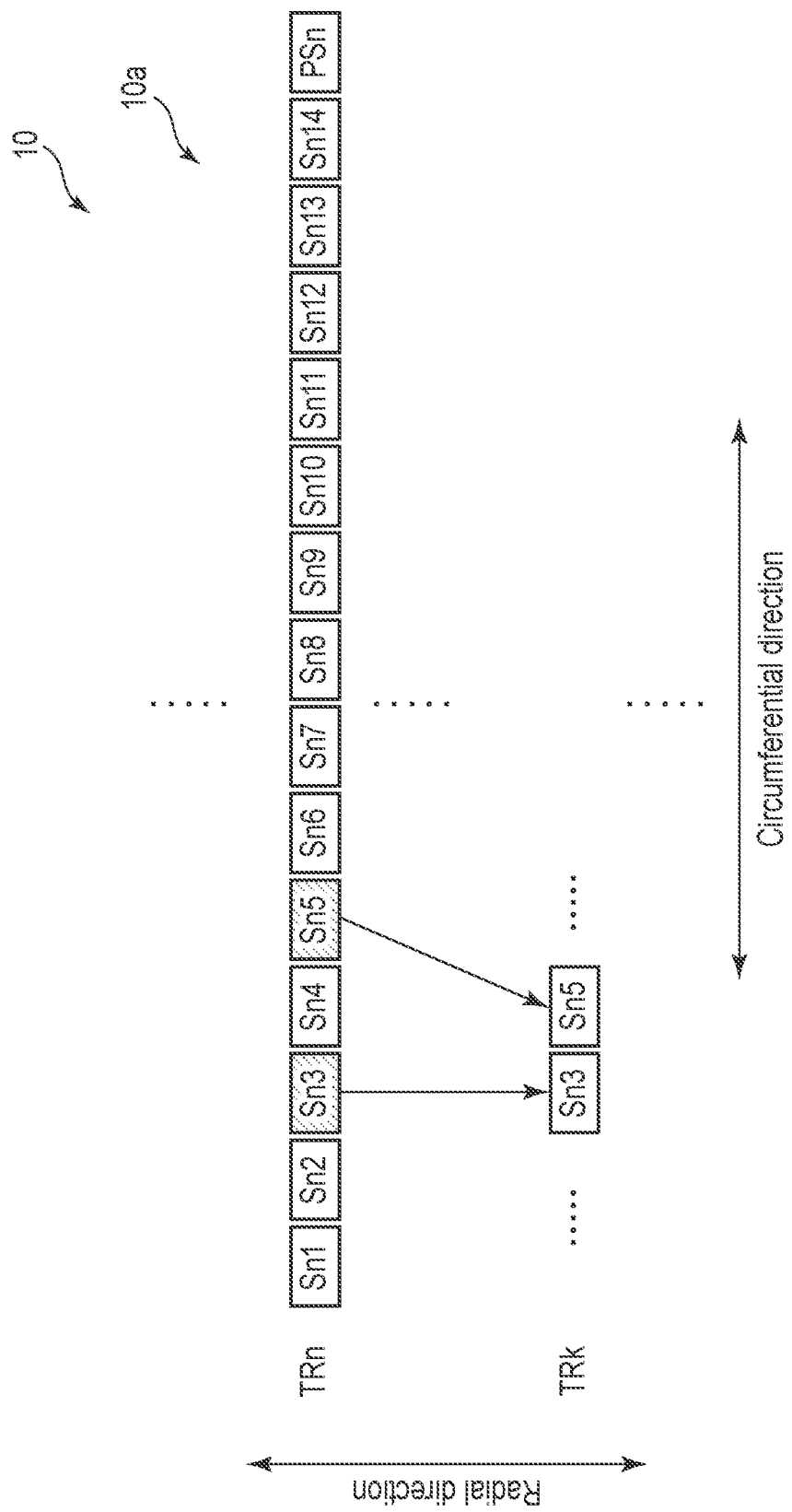
FIG. 11 is a schematic diagram illustrating an example of a parity sector generation method according to a first modification.

FIG. 11 is a schematic diagram illustrating an example of the parity sector generation method according to the first modification. FIG. 11 illustrates the tracks TRn and TRk. In FIG. 11, the sectors Sn3 and Sn5 correspond to the recovery sectors Sn3 and Sn5, respectively. In FIG. 11, the recovery sectors Sn3 and Sn5 are written and replaced with alternative sectors Sn3 and Sn5 of the track TRk, respectively.

In the example illustrated in FIG. 11, the MPU 60 reads the sectors Sn1, Sn2, Sn4, Sn6, Sn7, Sn8, Sn9, Sn10, Sn11, Sn12, Sn13, and Sn14 of the track TRn in the order described, and reads the alternative sectors Sn3 and Sn5 of the track TRk in the order described. The MPU 60 performs an XOR operation on each of the sectors Sn1, Sn2, Sn4, Sn6, Sn7, Sn8, Sn9, Sn10, Sn11, Sn12, Sn13, and Sn14 of the track TRn, and performs an XOR operation on each of the alternative sectors Sn3 and Sn5 of the track TRk. The MPU 60 calculates the parity data which is written in the parity sector PSn based on the result of the XOR operation on each of the sectors Sn1, Sn2, Sn4, Sn6, Sn7, Sn8, Sn9, Sn10, Sn11, Sn12, Sn13, and Sn14 of the track TRn and the result of the XOR operation on each of the alternative sectors Sn3 and Sn5 of the track TRk. In other words, the MPU 60 reads each sector of the track TRn other than the recovery sectors Sn3 and Sn5, and reads the alternative sectors Sn and Sn5 of the track TRk. The MPU 60 performs an XOR operation on each sector of the track TRn other than the recovery sectors Sn3 and Sn5, and performs an XOR operation on each of the alternative sectors Sn3 and Sn5 of the track TRk. The MPU 60 generates the parity sector PSn based on the result of the XOR operation on each sector of the track TRn other than the recovery sectors Sn3 and Sn5 and the result of the XOR operation on each of the alternative sectors Sn3 and Sn5 of the track TRk.

FIG. 12 is a flowchart illustrating an example of the parity sector generation method according to the first modification.

The MPU 60 re-assigns the target sector based on the sector quality of the target sector of the target track (B1201). The MPU 60 determines whether or not the write/read verification can be executed immediately (B1202). For example, the MPU 60 determines whether or not the write/read verification can be executed immediately or can be executed at the non-Idle time or the like when the target sector of the target track is re-assigned. In a case where it is determined that the write/read verification can be executed immediately (NO in B1202), the MPU 60 ends the processing. In a case where it determines that the write/read verification cannot be executed immediately (YES in B1202), the MPU 60 replaces the target sector of the target track with an alternative sector of another track (B1203). The MPU 60 generates a parity sector based on the result of the XOR operation over a plurality of tracks (B1204), and ends the processing. For example, the MPU 60 calculates the parity data as a result of the XOR operation corresponding to each sector of the target track other than the target sector and the alternative sector of another sector, and ends the processing.

According to the first modification, the magnetic disk device 1 re-assigns the target sector based on the sector quality of the target sector of the target track. In a case where the write/read verification cannot be immediately executed at the non-Idle time when the target sector of the target track is re-assigned, the magnetic disk device 1 replaces the target sector of the target track with an alternative sector of another track. In a case where the target sector is replaced with the alternative sector by re-assigning, the MPU 60 generates, over a plurality of tracks, the parity sector based on the result of the XOR operation corresponding to each sector of the target track other than the target sector and the alternative sector. Therefore, the magnetic disk device 1 can efficiently generate the parity sector.

(Second Modification)

A magnetic disk device 1 according to a second modification has a parity sector generation method different from that of the magnetic disk device 1 of the first embodiment and the first modification.

An MPU 60 re-assigns the target sector based on the sector quality of the target sector of the target track. In a case where the write/read verification (Write&read Verify) cannot be immediately executed at the non-Idle time when the target sector of the target track is re-assigned, the MPU 60 replaces the target sector with an alternative sector of another track. The MPU 60 executes the write/read verification on the target sector at the Idle time or the like when the target sector of the target track is re-assigned. In a case where the write/read verification is executed on the target sector, the MPU 60 determines whether the target sector is a permanently unused region or sector (hereinafter referred to as a permanent slip) or is not the permanent slip. In a case where it is determined that the target sector is a permanent slip, the MPU 60 calculates the parity data as a result of the XOR operation corresponding to each sector of the target track other than the target sector. In other words, in a case where it is determined that the target sector is a permanent slip, the MPU 60 generates a parity sector based on the result of the XOR operation corresponding to each sector of the target track other than the target sector.

For example, the MPU 60 re-assigns the recovery sector based on the sector quality of the recovery sector of the target track. In a case where the write/read verification (Write&read Verify) cannot be immediately executed at the non-Idle time when the recovery sector of the target track is re-assigned, the MPU 60 replaces the recovery sector with an alternative sector of another track. The MPU 60 executes the write/read verification on the recovery sector at the Idle time or the like when the recovery sector of the target track is re-assigned. In a case where the write/read verification is executed on the recovery sector, the MPU 60 determines whether or not the recovery sector is a permanent slip. In a case where it is determined that the recovery sector is a permanent slip, the MPU 60 calculates the parity data as a result of the XOR operation corresponding to each sector of the target track other than the recovery sector. In other words, in a case where it is determined that the recovery sector is a permanent slip, the MPU 60 generates a parity sector based on the result of the XOR operation corresponding to each sector of the target track other than the recovery sector.

Figure 13:
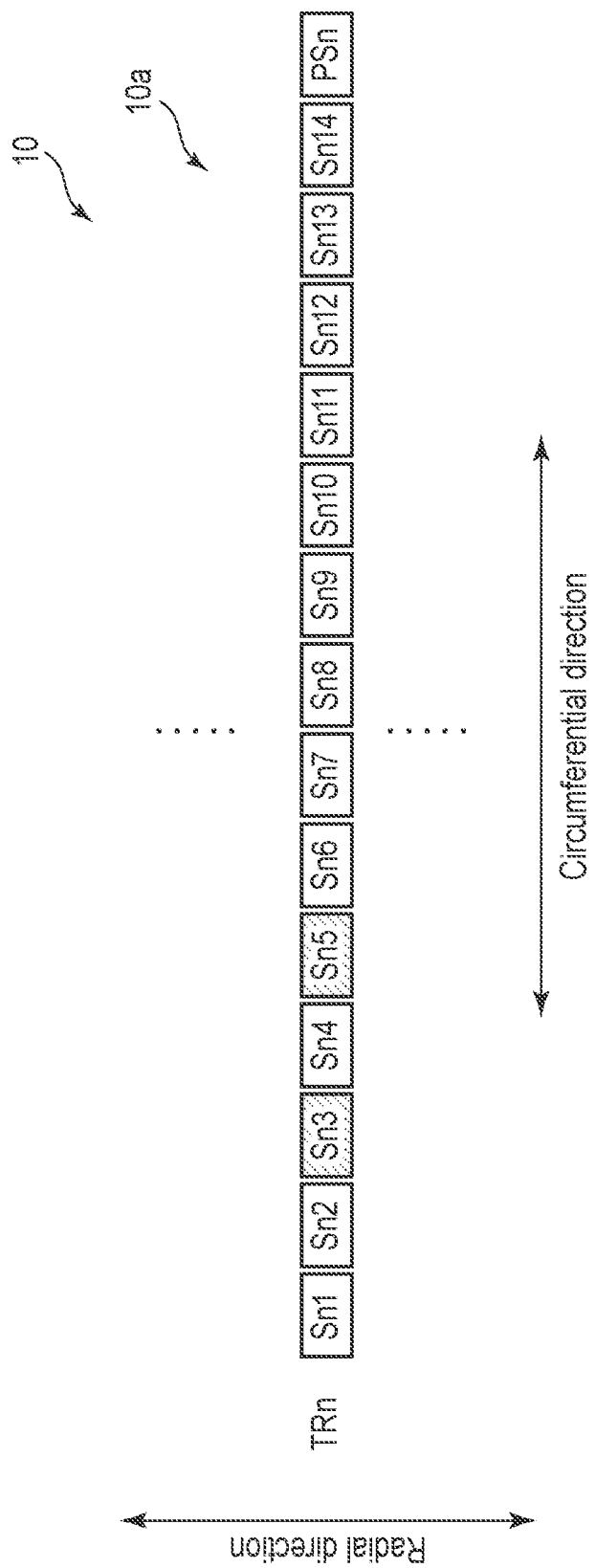
FIG. 13 is a schematic diagram illustrating an example of a parity sector generation method according to a second modification.

FIG. 13 is a schematic diagram illustrating an example of a parity sector generation method according to the second modification. FIG. 13 illustrates the track TRn. In FIG. 13, the sectors Sn3 and Sn5 correspond to the recovery sectors Sn3 and Sn5, respectively. In FIG. 13, the recovery sectors Sn3 and Sn5 are respectively written and replaced with alternative sectors of other tracks.

In the example illustrated in FIG. 13, the MPU 60 executes the write/read verification on the recovery sectors Sn3 and Sn5 at the Idle time or the like when the recovery sectors Sn3 and Sn5 of the track TRn are re-assigned. When the write/read verification executed on the recovery sectors Sn3 and Sn5, the MPU 60 determines whether or not the recovery sectors Sn3 and Sn5 are permanent slips. In a case where it is determined that the recovery sectors Sn3 and Sn5 are permanent slips, the MPU 60 reads the sectors Sn1, Sn2, Sn4, Sn6, Sn7, Sn8, Sn9, Sn10, Sn11, Sn12, Sn13, and Sn14 of the track TRn in the described order and performs an XOR operation. The MPU 60 calculates the parity data which is written in the parity sector PSn based on the result of the XOR operation on each of the sectors Sn1, Sn2, Sn4, Sn6, Sn7, Sn8, Sn9, Sn10, Sn11, Sn12, Sn13, and Sn14 of the track TRn. In other words, the MPU 60 reads each sector of the track TRn other than the recovery sectors Sn3 and Sn5 and performs an XOR operation. The MPU 60 generates the parity sector PSn based on the result of the XOR operation on each sector of the track TRn other than the recovery sectors Sn3 and Sn5.

FIG. 14 is a flowchart illustrating an example of the parity sector generation method according to the second modification.

The MPU 60 re-assigns the target sector based on the sector quality of the target sector of the target track (B1201). The MPU 60 replaces the target sector with an alternative sector (B1401) and executes the write/read verification on the target sector (B1402). In the write/read verification, the MPU 60 determines whether or not the target sector is a permanent slip (B1403). In a case where it is determined that the target sector is not the permanent slip (NO in B1403), the MPU 60 ends the processing. In a case where it is determined that the target sector is a permanent slip (YES in B1403), the MPU 60 generates a parity sector based on each sector of the target track other than the target sector (B1404), and ends the processing.

According to the second modification, the magnetic disk device 1 re-assigns the target sector based on the sector quality of the target sector of the target track. In a case where the write/read verification cannot be immediately executed at the non-Idle time when the target sector of the target track is re-assigned, the magnetic disk device 1 replaces the target sector of the target track with an alternative sector of another track. The MPU 60 executes the write/read verification on the target sector at the Idle time or the like when the target sector of the target track is re-assigned. When the write/read verification is executed on the target sector, the MPU 60 determines whether or not the target sector is a permanent slip. In a case where it is determined that the target sector is the permanent slip, the MPU 60 generates a parity sector based on the result of the XOR operation corresponding to each sector of the target track other than the target sector. Therefore, the magnetic disk device 1 efficiently generates the parity sector.

Second Embodiment

A magnetic disk device 1 according to a second embodiment has an error correction processing method different from that of the magnetic disk device 1 of the first embodiment and the first modification.

The magnetic disk device 1 of the second embodiment writes data to a disk 10 in a long-distance (or large-capacity) sector format, for example, a sector format of 4 k sector format or higher. For example, the magnetic disk device 1 of the second embodiment writes data in the 64 k sector format of the disk 10. Hereinafter, a sector having a capacity of 4 k or more may be referred to as a long-distance sector or a large-capacity sector.

An MPU 60 executes an XOR operation on the data of each long-distance sector of the target track, and calculates parity data (hereinafter, may be referred to as long-distance parity data) as a result of the XOR operation corresponding to the long-distance sector. In other words, the MPU 60 executes an XOR operation on the data of each long-distance sector of a particular track, and generates the parity sector (hereinafter, may be referred to as a long-distance parity sector) corresponding to the track based on the result of the XOR operation corresponding to these long-distance sectors.

The MPU 60 re-assigns the target long-distance sector based on the sector quality (hereinafter, referred to as long-distance sector quality) of the long-distance sector (hereinafter, may be referred to as a recovery long-distance sector) which is a recovery target. In other words, based on the quality (hereinafter, also referred to as long-distance data quality) of the data (hereinafter, may be referred to as target long-distance data) which is written on the target long-distance sector, a re-assign controller 660 re-assign the target long-distance data.

For example, in a case where error correction is executed on the target long-distance sector of the target track, the MPU 60 one-round reads the target track and executes error correction on the target long-distance sector of the target track. The MPU 60 compares all bits (hereinafter, may be referred to as all before-LDPC correction bits) corresponding to the data of the target long-distance sector before executing the LDPC correction processing with all bits (hereinafter, may be referred to as all after-LDPC correction bits) corresponding to the data of the target long-distance sector after executing the LDPC correction processing, and counts the total bit correction number as the bits obtained by error-correcting the bits changed between the all before-LDPC correction bits and the all after-LDPC correction bits.

For example, in a case where error correction is executed on the target long-distance sector of the target track, the re-assign controller 660 determines the long-distance sector quality of the target long-distance sector based on the LDPC unsatisfied Parity Check corresponding to the target long-distance sector. LDPC is configured by a plurality of Parity Check Codes. In a case where all the Parity Checks of the LDPC corresponding to the target long-distance data of the target long-distance sector are satisfied, the re-assign controller 660 considers that all the errors of the target long-distance sector are corrected. That is, the re-assign controller 660 determines the long-distance sector quality of the target long-distance sector based on the number of satisfied Parity Checks or the number of unsatisfied Parity Checks among all the Parity Checks of the LDPC corresponding to the target long-distance data of the target long-distance sector. For example, in a case where error correction is executed on the target long-distance sector of the target track, the re-assign controller 660 determines the long-distance sector quality of the target long-distance sector based on the number of unsatisfied Parity Checks corresponding to the target long-distance sector before the LDPC correction processing by one-round reading the target track.

For example, in a case where error correction is executed on the target long-distance sector, the re-assign controller 660 determines the long-distance sector quality of the target long-distance sector based on a metric difference in the Viterbi path metric of the Viterbi decoding processing for the data of the target long-distance sector. In the Viterbi decoding processing, the path with the smaller metric is selected, and thus the possibility of selecting a wrong path decreases when the metric difference increases. The re-assign controller 660 determines that the long-distance sector quality of the target long-distance sector is excellent as the metric difference is larger, and determines that the long-distance sector quality of the target long-distance sector is not excellent as the metric difference is smaller. For example, in a case where the metric difference corresponding to the data of the target long-distance sector is larger than the metric difference threshold, the re-assign controller 660 determines that the long-distance sector quality of the target long-distance sector is excellent. Further, in a case where it is determined that the metric difference corresponding to the data of the target long-distance sector is equal to or less than the metric difference threshold, the re-assign controller 660 determines that the long-distance sector quality of the target long-distance sector is not excellent.

For example, in a case where error correction is executed on the target long-distance sector, the re-assign controller 660 determines the long-distance sector quality of the target long-distance sector based on a drop in the waveform (or the amplitude of waveform) of the target long-distance data obtained by reading the target long-distance sector. In a case where it is determined that the section which has a waveform drop equal to or less than the waveform drop threshold of the target long-distance data when the target long-distance sector is read is equal to or greater than the waveform drop section threshold, the re-assign controller 660 determines that the region of the disk 10 corresponding to the target long-distance sector is defective. For example, in a case where it is determined that the section in which the drop in the waveform of the target long-distance data when the target long-distance sector is read is equal to or less than the waveform drop threshold is equal to or greater than the waveform drop section threshold, the re-assign controller 660 determines that the long-distance sector quality of the target long-distance sector is not excellent. For example, in a case where it is determined that the section in which the drop in the waveform of the target long-distance data when the target long-distance sector is read is equal to or less than the waveform drop threshold is less than the waveform drop section threshold, the re-assign controller 660 determines that the long-distance sector quality of the target long-distance sector is excellent.

According to the second embodiment, in a case where a target long-distance sector is detected in the track specified by the command input from the host 100 or the like, the magnetic disk device 1 executes error correction on the target long-distance sector from the initial reading of the target long-distance sector. In a case where the target long-distance sector can be recovered, the magnetic disk device 1 checks the long-distance sector quality of the recovery target long-distance sector. The magnetic disk device 1 re-assigns the target long-distance data based on the long-distance sector quality of the recovery target long-distance sector. In a case where a sector recoverable only by the error correction is generated due to DOW or the like, the magnetic disk device 1 corrects the target long-distance sector by error correction from the initial reading. For this reason, the magnetic disk device 1 can increase the TPI of the disk 10. Therefore, the magnetic disk device 1 can improve the recording density.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk;
   a head that writes data to the disk and reads data from the disk; and
   a controller that executes error correction on a first sector which is unreadable in a first track from an initial reading time of initially one-round reading the first track of the disk based on first parity data corresponding to the first track, wherein
   in a case where the first sector becomes readable by executing the error correction, the controller re-assigns the first sector based on quality of the first sector, and the controller starts reading the first track from a first position of the first track in a circumferential direction, and in a case where the first sector is unreadable at a second position of the first track in the circumferential direction, the controller one-round reads the first track and executes the error correction on the first sector.

2. The magnetic disk device according to claim 1, wherein, in a case where the first sector becomes readable when the error correction is executed between the initial reading time of one-round reading the first track with starting reading from the first position and a third reading time of three-round reading the first track with starting reading from the first position, the controller re-assigns the first sector based on the quality of the first sector.

3. The magnetic disk device according to claim 1, wherein the controller checks the quality of the first sector based on the number of all bits in first data of the first sector corrected by the error correction.

4. The magnetic disk device according to claim 1, wherein the controller checks the quality of the first sector based on the number of Parity Checks which are unsatisfied when LDPC is executed on first data of the first sector.

5. The magnetic disk device according to claim 1, wherein the controller checks the quality of the first sector based on a metric difference between a selection path and a competition path in Viterbi decoding processing for first data of the first sector.

6. The magnetic disk device according to claim 1, wherein the controller checks the quality of the first sector based on a drop in a waveform of first data of the first sector.

7. A magnetic disk device comprising:
a disk;
a head that writes data to the disk and reads data from the disk; and
a controller that executes error correction on a first sector which is unreadable in a first track from an initial reading time of initially one-round reading the first track of the disk based on first parity data corresponding to the first track, wherein
in a case where the first sector becomes readable by executing the error correction, the controller re-assigns the first sector based on quality of the first sector, and
in a case where the first sector is re-assigned to a second sector of a second track different from the first track, the controller generates the first parity data based on all sectors of the first track other than the first sector and the second sector.

8. The magnetic disk device according to claim 7, wherein the controller reads all the sectors of the first track other than the first sector, reads the second sector of the second track, and generates the first parity data based on all the sectors of the first track other than the first sector and the second sector.

9. A magnetic disk device comprising:
a disk;
a head that writes data to the disk and reads data from the disk; and
a controller that executes error correction on a first sector which is unreadable in a first track from an initial reading time of initially one-round reading the first track of the disk based on first parity data corresponding to the first track, wherein
in a case where the first sector becomes readable by executing the error correction, the controller re-assigns the first sector based on quality of the first sector, and
in a case where the first sector is re-assigned to a second sector of a second track different from the first track, and it is determined that the first sector is not used, the controller generates the first parity data based on all sectors of the first track other than the first sector.

10. The magnetic disk device according to claim 9, wherein the controller reads all the sectors of the first track other than the first sector, and generates the first parity data based on all the sectors of the first track other than the first sector.

11. A magnetic disk device comprising:
a disk;
a head that writes data to the disk and reads data from the disk; and
a controller that executes error correction on a first sector which is unreadable in a first track from an initial reading time of initially one-round reading the first track of the disk based on first parity data corresponding to the first track, wherein
in a case where the first sector becomes readable by executing the error correction, the controller re-assigns the first sector based on quality of the first sector, and
in a case where a third sector different from the first sector which is unreadable in the first track is error-corrected based on the first parity data, and the error-corrected third sector is readable, the third sector is re-assigned based on quality of the third sector.

12. A error correction method which is a re-assigning method for a magnetic disk device including a disk and a head that writes data to the disk and reads data from the disk, the method comprising:
executing error correction on a first sector which is unreadable in a first track from an initial reading time of initially one-round reading the first track of the disk based on first parity data corresponding to the first track;
re-assigning the first sector based on quality of the first sector in a case where the first sector becomes readable by executing the error correction;
starting reading the first track from a first position of the first track in a circumferential direction; and
one-round reading the first track and executing the error correction on the first sector in a case where the first sector is unreadable at a second position of the first track in the circumferential direction.

13. The error correction method according to claim 12, further comprising:
re-assigning the first sector based on the quality of the first sector in a case where the first sector becomes readable when the error correction is executed between the initial reading time of one-round reading the first track with starting reading from the first position and a third reading time of three-round reading the first track with starting reading from the first position.

14. The error correction method according to claim 12, further comprising:
checking the quality of the first sector based on the number of all bits in first data of the first sector corrected by the error correction.

15. The error correction method according to claim 12, further comprising:
checking the quality of the first sector based on the number of Parity Checks which are unsatisfied when LDPC is executed on first data of the first sector.

* * * * *